US012236506B2

(12) United States Patent
Takeichi et al.

(10) Patent No.: US 12,236,506 B2
(45) Date of Patent: Feb. 25, 2025

(54) STORAGE MEDIUM, IMAGE PROCESSING APPARATUS, AND IMAGE PROCESSING METHOD

(71) Applicant: CANON KABUSHIKI KAISHA, Tokyo (JP)

(72) Inventors: Jumpei Takeichi, Kanagawa (JP); Hiroyasu Kunieda, Kanagawa (JP); Takayuki Yamada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 17/665,614

(22) Filed: Feb. 7, 2022

(65) Prior Publication Data

US 2022/0262054 A1    Aug. 18, 2022

(30) Foreign Application Priority Data

Feb. 12, 2021    (JP) ................................ 2021-020374

(51) Int. Cl.
*G06T 11/60*    (2006.01)
(52) U.S. Cl.
CPC .......... *G06T 11/60* (2013.01); *G06T 2200/24* (2013.01)
(58) Field of Classification Search
CPC ...... G06T 11/60; G06T 2200/24; G06T 11/00
See application file for complete search history.

(56) References Cited

U.S. PATENT DOCUMENTS

| 9,189,681 | B2 | 11/2015 | Kunieda et al. |
| 9,214,027 | B2 | 12/2015 | Sumi et al. |
| 9,275,270 | B2 | 3/2016 | Suwa et al. |
| 9,594,534 | B2 | 3/2017 | Sasaki et al. |
| 10,013,395 | B2 | 7/2018 | Kajiwara et al. |
| 10,275,652 | B2 | 4/2019 | Yamamoto et al. |
| 10,290,135 | B2 | 5/2019 | Mizoguchi et al. |
| 10,437,434 | B2 | 10/2019 | Tomono et al. |

(Continued)

FOREIGN PATENT DOCUMENTS

| JP | 2002-335487 A | 11/2002 |
| JP | 2016-066328 A | 4/2016 |
| JP | 2020-140557 A | 9/2020 |

OTHER PUBLICATIONS

Co-pending U.S. Appl. No. 17/533,627.

(Continued)

*Primary Examiner* — David F Dunphy
(74) *Attorney, Agent, or Firm* — Venable LLP

(57) ABSTRACT

To, in a case where editing of a common double-page spread is performed on one user's album, selectively apply the contents of that editing result on a per user basis, a program is provided which causes a computer to function as: an editing unit configured to edit layouts of albums each having an attribute of a common double-page spread common to all albums and an attribute of an individual double-page spread in each album; a first determination unit configured to determine whether an edited double-page spread in a predetermined album on which editing is performed is a common double-page spread; and a second determination unit configured to determine, for each album other than the predetermined album, whether to apply a content of a result of the editing of the predetermined album to the album in a case where a result of the determination by the first determination unit is positive.

20 Claims, 26 Drawing Sheets

(56) References Cited

U.S. PATENT DOCUMENTS

| | | |
|---|---|---|
| 10,740,641 B2 | 8/2020 | Iguchi et al. |
| 10,742,823 B2 | 8/2020 | Iguchi et al. |
| 10,796,405 B2 | 10/2020 | Kunieda et al. |
| 10,958,796 B2 | 3/2021 | Obayashi et al. |
| 11,074,734 B2 | 7/2021 | Kunieda et al. |
| 11,089,170 B2 | 8/2021 | Kunieda et al. |
| 11,107,260 B2 | 8/2021 | Yamada |
| 11,140,277 B2 | 10/2021 | Yamada et al. |
| 11,218,603 B2 | 1/2022 | Kunieda et al. |
| 2016/0092054 A1 | 3/2016 | Tomono et al. |
| 2017/0186201 A1* | 6/2017 | Obayashi ............... G06V 20/35 |
| 2019/0325627 A1* | 10/2019 | Kunieda ................. G06T 11/60 |
| 2020/0233569 A1* | 7/2020 | Yamaji .................. G06F 3/0482 |
| 2020/0279422 A1 | 9/2020 | Yamada et al. |
| 2020/0279423 A1 | 9/2020 | Yamada et al. |
| 2020/0279425 A1 | 9/2020 | Yamada |
| 2020/0279426 A1 | 9/2020 | Yamada et al. |
| 2020/0279427 A1 | 9/2020 | Yamada et al. |
| 2020/0336607 A1 | 10/2020 | Kunieda |
| 2020/0336608 A1 | 10/2020 | Kunieda |
| 2020/0388062 A1 | 12/2020 | Kunieda et al. |
| 2020/0388063 A1 | 12/2020 | Kunieda et al. |
| 2021/0366171 A1 | 11/2021 | Yamada |

OTHER PUBLICATIONS

Co-pending U.S. Appl. No. 17/533,708.
Co-pending U.S. Appl. No. 17/533,864.
Co-pending U.S. Appl. No. 17/665,612.
Co-pending U.S. Appl. No. 17/665,613.
Co-pending U.S. Appl. No. 17/665,615.
Co-pending U.S. Appl. No. 17/665,617.
Co-pending U.S. Appl. No. 17/665,620.
Co-pending U.S. Appl. No. 17/665,621.
Jan. 14, 2025 Japanese Official Action in Japanese Patent Appln. No. 2021-020374.

* cited by examiner

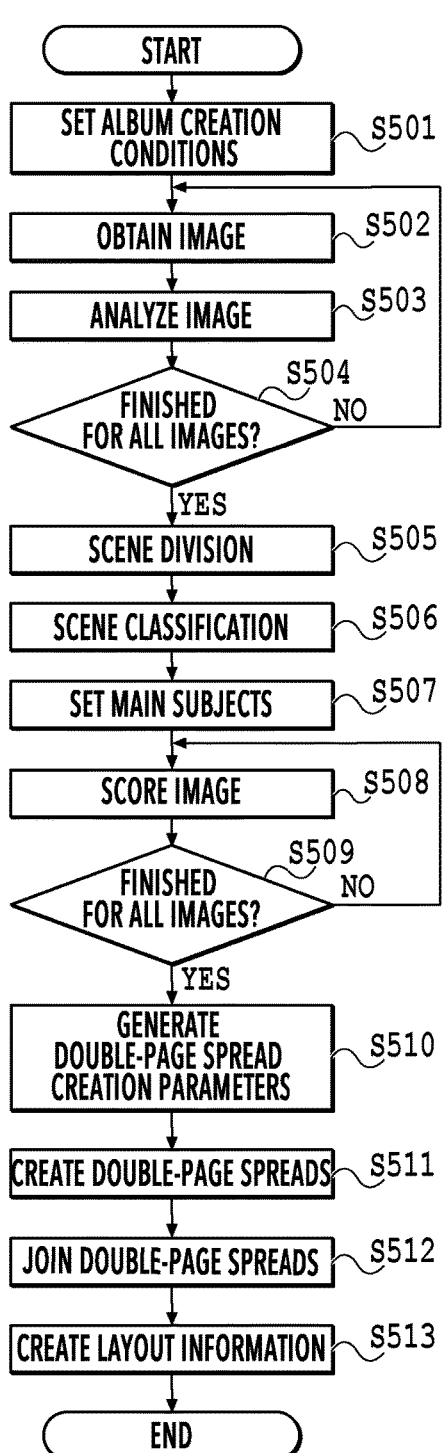
FIG.5A
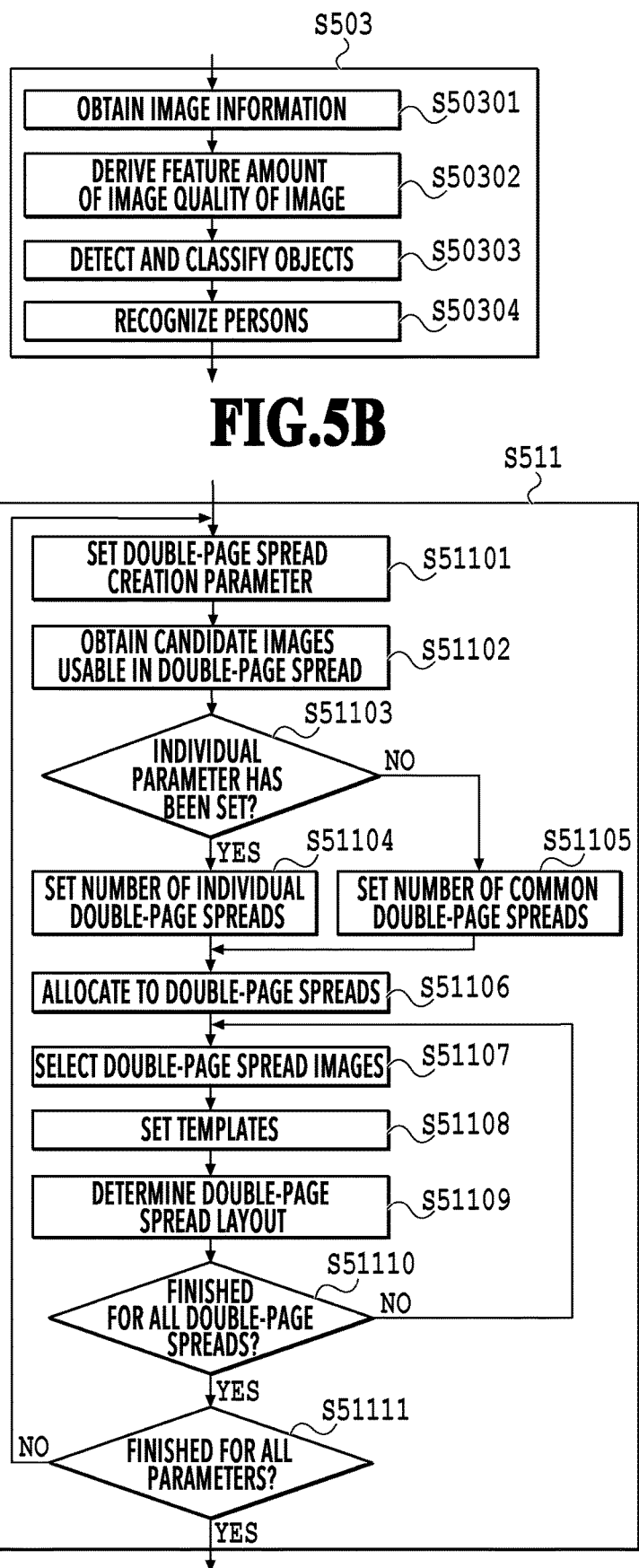
FIG.5B
FIG.5C

| SCENE | IMAGE CAPTURE PERIOD (TIME) | | NUMBER OF IMAGES CAPTURED | | NUMBER OF PEOPLE PHOTOGRAPHED | |
|---|---|---|---|---|---|---|
| | AVERAGE | STANDARD DEVIATION | AVERAGE | STANDARD DEVIATION | AVERAGE | STANDARD DEVIATION |
| TRIP | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG.7

STORAGE MEDIUM, IMAGE PROCESSING APPARATUS, AND IMAGE PROCESSING METHOD

BACKGROUND

Field

The present disclosure relates to a technique for creating albums.

Description of the Related Art

In addition to the spread of digital cameras, the spread of smart devices and the improvement in the camera performance of smart devices have rapidly increased the number of photos a user takes. Japanese Patent Laid-Open No. 2016-66328 (hereinafter referred to as Document 1) proposes a method for a plurality of users to create an album together.

Also, a technique has been known in which, in a case of creating a plurality of albums, pieces of album data are automatically generated each of which contains a double-page spread(s) created based on a versatile criterion common to the plurality of albums (hereinafter "common double-page spread(s)") and a double-page spread(s) created based on an individual criterion dedicated to one album (hereinafter "individual double-page spread(s)".

SUMMARY

In a case where albums of a plurality of users are created and then editing of a common double-page spread is performed on the album of one user, the contents of the editing result are usually applied to the albums of the other user(s). However, a case where there may be a user who does not wish to apply the contents of such an editing result to the user's own album should be taken into consideration. In this case, it is not appropriate to apply the contents of the result of editing of a common double-page spread in the album of one user uniformly to the albums of all users other than the one user.

Thus, in view of the above problem, an object of embodiments is to, in a case where editing of a common double-page spread is performed on the album of one user, selectively apply the contents of that editing result on a per user basis.

One embodiment of the present invention is a non-transitory computer readable storage medium storing a program that causes a computer to function as: an editing unit configured to edit layouts of a plurality of albums each having an attribute of a common double-page spread common to all of the albums and an attribute of an individual double-page spread in each of the albums as double-page spread attributes; a first determination unit configured to determine whether an edited double-page spread in a predetermined album on which editing is performed is a common double-page spread; and a second determination unit configured to determine, for each of the plurality of albums other than the predetermined album, whether the album is an album to which to apply a content of a result of the editing of the predetermined album in a case where a result of the determination by the first determination unit is positive.

Further features of the present disclosure will become apparent from the following description of exemplary embodiments with reference to the attached drawings.

BRIEF DESCRIPTION OF THE DRAWINGS

FIGS. 5A to 5C are process flow diagrams of automatic layout;

FIG. 7 is a diagram explaining scene classification;

FIGS. 15B-1 and 15B-2 are diagrams explaining examples of the album editing screen;

DESCRIPTION OF THE EMBODIMENTS

Hereinbelow, embodiments of the present disclosure will be described in detail by using the drawings.

Embodiment 1

In the present embodiment, an application for album creation (hereinafter also referred to as "application" or simply "app") is run on an image processing apparatus, and the application is caused to generate pieces of album data in each of which a plurality of photo images are automatically laid out. By printing these pieces of album data, a plurality of albums can be created as printed products. In the present embodiment, a double-page spread(s) common to at least two albums and a double-page spread(s) individually set for each album are created. Each album has an individual double-page spread(s) with a different structure for the subject to be laid out therein with a particular emphasis (hereinafter "main subject"), for example. The total number of double-page spreads forming each album (hereinafter "the total number of double-page spreads") is designated by the user who operates the app and is the same for all albums. However, the number of common double-page spreads and the number of individual double-page spreads in each album vary according to the image group and settings. The double-page spreads and the images placed in the double-page spreads are arranged in order of image capture time.

By using individual double-page spreads, the plurality of albums created can each be an album partly dedicated to its main subject. That is, the plurality of albums created in the present embodiment are expected not to be completely identical albums in which the same images are placed in the same layout in every double-page spread. Note that some of the plurality of albums thus created may consequently be completely identical albums.

Also, in the present embodiment, the user can edit the piece of album data of each album created to include a common double-page spread(s) and an individual double-page spread(s). The following description is broadly divided into a process of automatically generating pieces of album data and a process of editing the generated pieces of album data by the user. In the user editing process too, the processing is performed automatically. Configurations for the process of automatically generating pieces of album data will be described first. The process of editing the generated pieces of album data by the user will be described after that.

<<Album Data Generation Process>>
<Hardware Configuration of Image Processing Apparatus>

A hardware configuration of the image processing apparatus in the present embodiment will be described below using FIG. 1. While the following will describe a case where the image processing apparatus is an information processing apparatus (PC), another apparatus such as a smartphone may be employed as the image processing apparatus.

Figure 1:
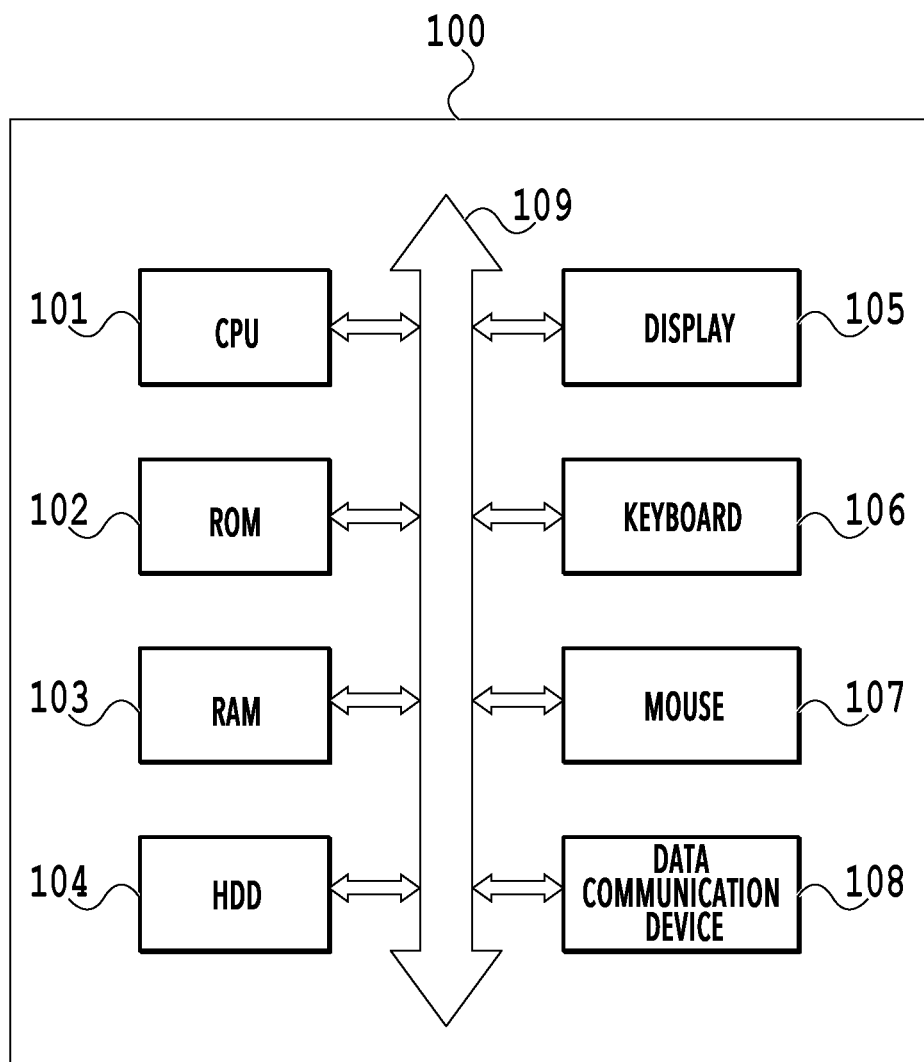
FIG. 1 is a block diagram of hardware capable of executing applications according to the present disclosure.

As illustrated in FIG. 1, an image processing apparatus 100 has a CPU 101, a ROM 102, a RAM 103, an HDD 104, a display 105, a keyboard 106, a mouse 107, and a data communication device 108. These parts are connected by a data bus 109 and can send and receive data to and from each other.

The CPU 101 controls the entire image processing apparatus 100. Also, the CPU 101 executes the image processing method to be described in the present embodiment in accordance with a program. Note that while the image processing apparatus has a single CPU in FIG. 1, the image processing apparatus may have a plurality of CPUs.

The ROM 102 stores programs to be executed by the CPU 101. The RAM 103 provides a memory to temporarily store various pieces of information while the CPU 101 executes a program. The HDD 104 stores a database holding image files and the results of processes such as an image analysis and the like, and so on. In the present embodiment, this HDD 104 stores an application program for album creation. Note that this application program is also called "album creation app", and will be described later using FIGS. 2A and 2B, etc.

The display 105 is a device that displays a user interface (hereinafter "UI") and an image layout result in the present embodiment to present them to the user. The display 105 may have the function of a touch sensor. The keyboard 106 is one of input devices included in the image processing apparatus 100 and is used to, for example, input predetermined information into a GUI displayed on the display 105. In the present embodiment, the user inputs a desired number of double-page spreads in each album with the keyboard 106. The mouse 107 is one of the input devices included in the image processing apparatus 100 and is used to, for example, click and press buttons in a GUI displayed on the display 105.

The data communication device 108 is a device for communicating with external apparatuses, such as a printer and a server. For example, pieces of album data as the result of automatic layout are sent to the printer or the server connected to the image processing apparatus 100 via the data communication device 108. The data bus 109 connects each of the above constituent elements and the CPU 101 to each other. The above are the contents of the hardware configuration of the image processing apparatus in the present embodiment.

<Software Configuration of Image Processing Apparatus>

A software configuration of the image processing apparatus in the present embodiment, in other words, a functional configuration implemented by the album creation application installed in the image processing apparatus, will be described below using FIGS. 2A and 2B. The album creation application is launched in response to the user double-clicking the application's icon displayed on the display 105 with the mouse 107. While the album creation application has various functions, its automatic layout function provided by an automatic layout processing component 202 will be mainly described below.

Figure 2A:
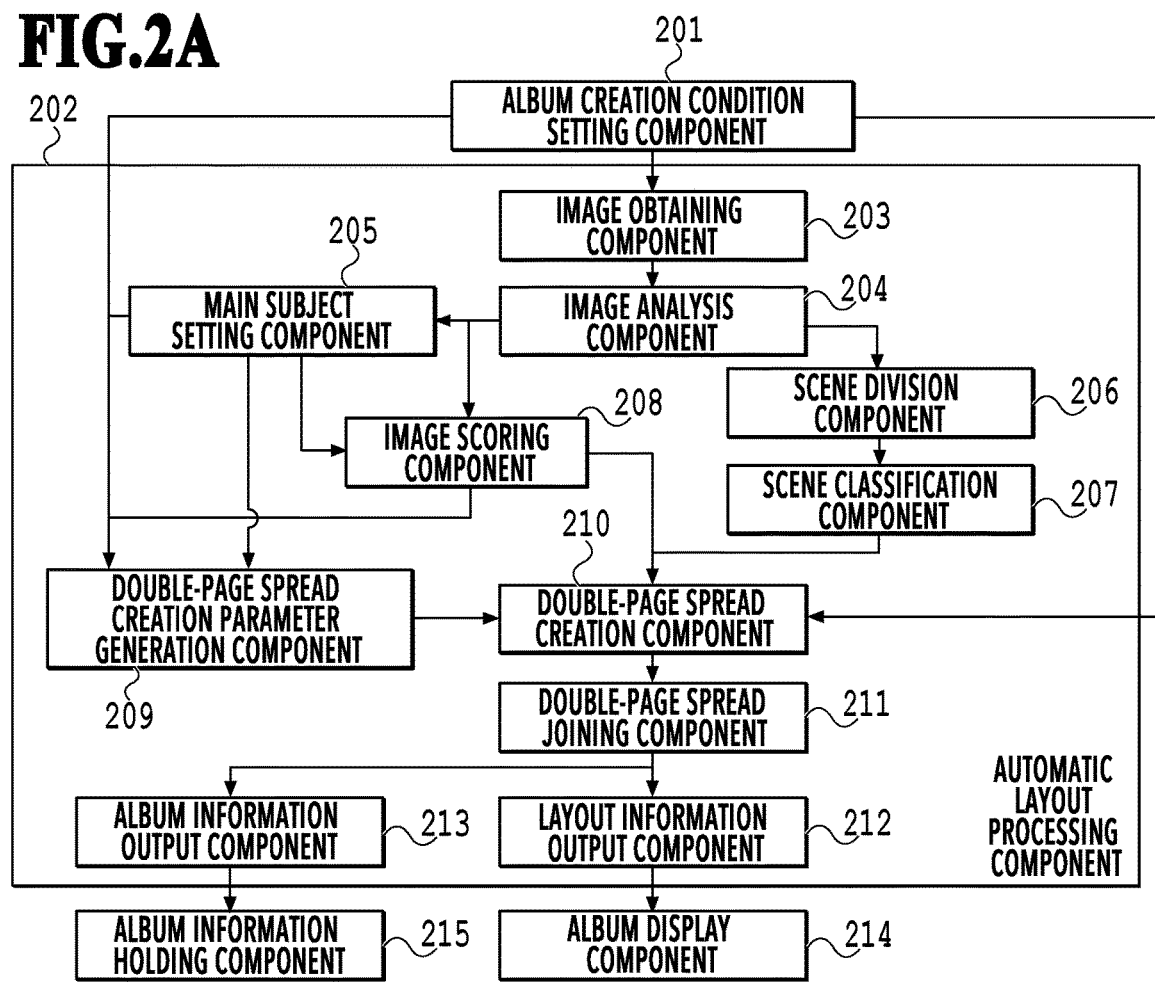
FIGS. 2A and 2B are software block diagrams of an album creation application.
Figure 2B:
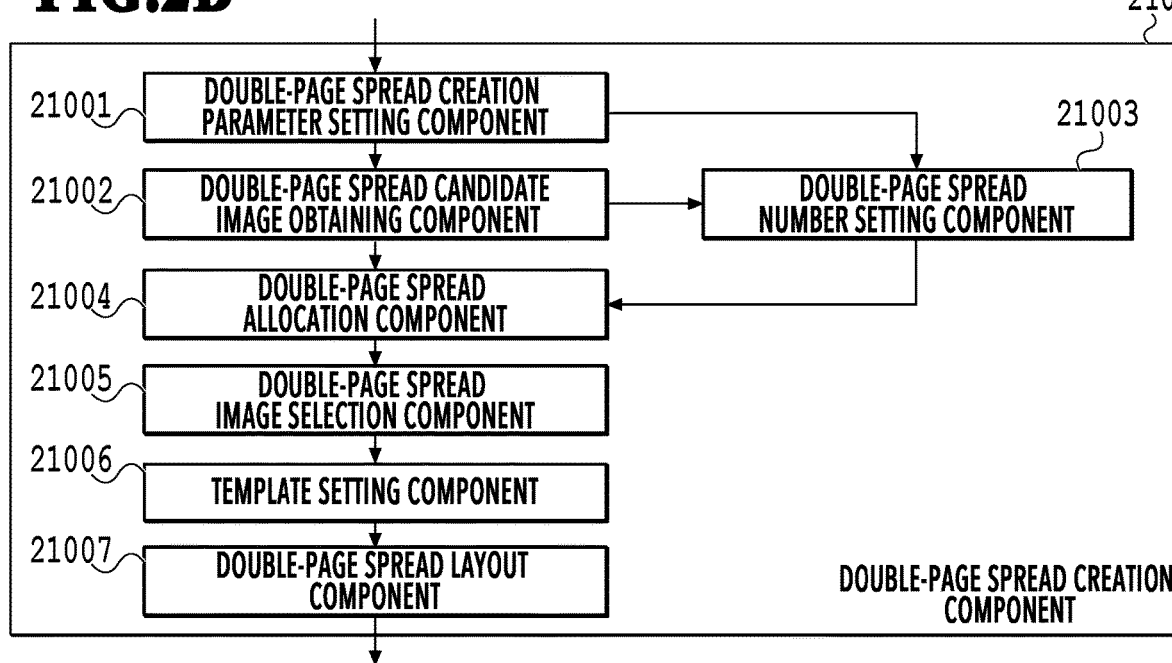

As illustrated in FIG. 2A, this app has an album creation condition setting component 201, the automatic layout processing component 202, an album display component 214, and an album information holding component 215. "Automatic layout function" refers to a function of generating album data by classifying and selecting captured photo images based on their contents, attributes, and the like and then laying them out. The album data thus generated is displayed on the display 105.

An album creation condition setting component 201 sets album creation conditions corresponding to the user's mouse operation to the automatic layout processing component 202. In the present embodiment, an image group to be used for the albums, the total number of double-page spreads per album, material of the albums, the number of albums, and the main subject in each album are set as the album creation conditions. The image group may be set, for example, by using information attached to individual pieces of image data such as their image capture dates and times or by using their attribute information. Alternatively, the image group may be set based on the structure of a file system in which pieces of image data are stored via designation in a device or directory or the like. This image group may be a storage destination storing pieces of image data from users who are potential main subjects or a storage destination storing pieces of image data collected from a particular user. Note that, in the context of, for example, a display, "double-page spread" is a single display window and, in the context of a printed product, it is a pair of mutually facing pages (i.e., two pages) which a user can view together at the same time in a state where the book is opened. Note that the two pages forming a double-page spread is formed either as different printed sheets bound to face each other or as a single printed sheet folded at the center. The description will be given herein based on concepts of double-page spread as above, but a double-page spread may just be pages. Also, a main subject refers to a subject to be laid out with a particular emphasis within an album. For example, it is a category of object such as a particular person, dog, cat, flower, or dish, the tonality of a whole object or image, or the like. The main subjects herein are persons for the sake of description.

Figure 3:
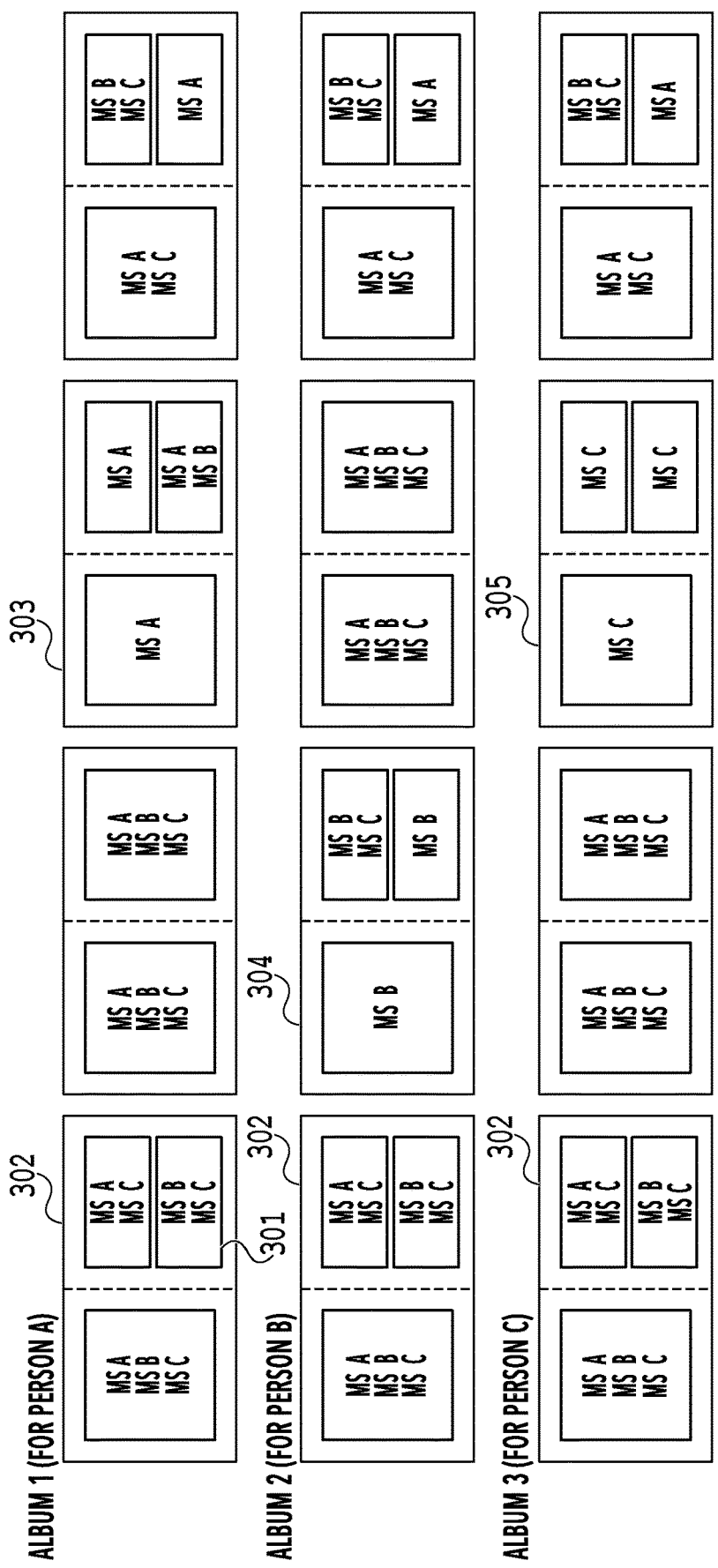
FIG. 3 is a diagram explaining image layouts.

Now, albums to be created in the present embodiment will be described using FIG. 3. In the present embodiment, different versions of an album are created based on the number of albums and the main subject of each album set by the album creation condition setting component 201. In the example of FIG. 3, an album 1, an album 2, and an album 3 are created as the different versions of an album.

Each album includes a "common double-page spread(s)" in which the same images are placed in the same layout for all of the different versions of the album, and an "individual double-page spread(s)" whose images or image layout is different from those in the other albums. In the example of FIG. 3, the albums 1 to 3 each include a common double-page spread 302. Moreover, the album 1 includes an individual double-page spread 303, the album 2 includes an individual double-page spread 304, and the album 3 includes an individual double-page spread 305.

An image 301 is an image placed in a double-page spread, and the characters in the image 301 represent main subjects appearing in the image. In the following figures, "main subject A", "main subject B", and "main subject C" are abbreviated as "MS A", "MS B", and "MS C", respectively. As illustrated in FIG. 3, the common double-page spread 302 includes images with a plurality of main subjects. On the other hand, the individual double-page spreads 303 to 305 each include an image(s) with only a particular main subject, for example, the individual double-page spread 303 includes images with only a main subject A. Thus, in the case of creating a plurality of albums in the present embodiment, the plurality of albums each include a double-page spread(s) created based on a different criterion. That is, by being created based on a different criterion, the double-page spread thus created appears as a different double-page spread.

The automatic layout processing component 202 has an image obtaining component 203, an image analysis component 204, an main subject setting component 205, a scene division component 206, a scene classification component 207, an image scoring component 208, a double-page spread creation parameter generation component 209, and a double-page spread creation component 210. The automatic layout processing component 202 also has a double-page spread joining component 211, a layout information output component 212, and an album information output component 213.

The image obtaining component 203 obtains, from among images stored in the HDD 104, an image group satisfying the album creation conditions set by the album creation condition setting component 201. The image group here refers to a group of images as candidates to be laid out in the album creation. For example, in a case where the image capture date and time are designated to be January 1, XX (year) to December 31, XX (year), all images captured from January 1, XX (year) to December 31, XX (year) are the group of images as candidates to be laid out. The images stored in the HDD 104 include still images, cutout images cut out from moving images, and the like. The still images and cutout images are images obtained from an image capture device, such as a digital camera or a smart device. The image capture device may be included in the image processing apparatus 100 or included in an external apparatus associated with the image processing apparatus 100. Note that in a case where the image capture device is an external apparatus, the image obtaining component 203 obtains images via the data communication device 108. Also, the still images and cutout images may be images obtained from an external network or server via the data communication device 108. The images obtained from the network or server include social networking service images (hereinafter "SNS images"). Note that, by executing an OS program, the CPU 101 analyzes data attached to the image data of each image to figure out the storage source from which the image has been obtained. Here, images may be obtained from an SNS via the application to manage the source from which the images are obtained within the application. Note that the images to be obtained by the image obtaining component 203 are not limited to the above and may be other types of images.

The image analysis component 204 analyzes the pieces of image data obtained by the image obtaining component 203. In the present embodiment, the image analysis component 204 derives a feature amount of each image and executes determination of objects and detection of faces in the images, expression recognition on the detected faces, and personal recognition on the detected faces. Further, the image analysis component 204 refers to the data attached to each piece of image data obtained from the HDD 104 (e.g., Exif information) and obtains information on the image capture date and time. Note that the information obtained as a result of the analysis of each piece of image data by the image analysis component 204 will be referred to as "analysis information".

The main subject setting component 205 sets the main subject to be emphasized for each album. In the present embodiment, the main subject setting component 205 obtains information on each album's main subject to be emphasized sent from the album creation condition setting component 201.

The image scoring component 208 scores each image based on the album creation conditions set by the album creation condition setting component 201 and the analysis information derived by the image analysis component 204. In the present embodiment, the image scoring component 208 scores each image such that an image suitable to be laid out is given a high score. For the scoring to be performed such that an image suitable to be laid out is given a high score, the analysis information on each image, the result of classification of the image, image information, the album creation conditions, and the like are used. Incidentally, another type of information may be additionally or alternatively used. Examples of the image suitable to be laid out include an image with high sensuousness such as a high contrast or sharp edges, and an image in which its subject, such as a person, an animal, or a building, that serves as a central theme (i.e., main subject) appears large. Further, the image scoring component 208 performs the scoring for each main subject set by the main subject setting component 205. For example, the image scoring component 208 gives a low score to an image which has remarkably high sensuousness but does not have the set main subject appearing therein, and gives a high score to an image which is captured under a bad condition, such as backlight, but has the set main subject appearing large therein.

The scene division component 206 divides the image group obtained by the image obtaining component 203 by scene by using the analysis information derived by the image analysis component 204. "Scene" here means a set of images grouped according to the analysis information (sub image group). For example, the scene division component 206 determines that two images captured at different times belong to the same scene in a case where the difference in image capture time is less than or equal to a predetermined threshold value, and determines that images with the same person or background belong to the same scene.

The scene classification component 207 determines the category of each scene obtained by the scene division component 206. Examples of the scene categories include a situation such as indoor or outdoor, the event in which the images were captured, such as a trip or a wedding ceremony, and so on.

The double-page spread creation parameter generation component 209 generates a plurality of parameters for creating double-page spreads based on the main subjects set by the main subject setting component 205 and the analysis information derived by the image analysis component 204. The plurality of parameters include, for example, a parameter for common double-page spreads and a parameter for individual double-page spreads. Each of the parameters here is a setting value that defines a criterion for creating a double-page spread. Examples of such parameters include a weight or threshold value that determines the degree of priority of each score obtained by the image scoring component 208, which will be used in the selection of images to be used in double-page spreads. This is a setting value for selecting whether to prioritize an image with only a particular main subject or an image with two or more main subjects among images with the main subjects set by the main subject setting component 205. By using the plurality of parameters, the double-page spread creation criterion varies by album. Also, the double-page spread creation parameters include a parameter for deriving a score of an image taking into account its relativeness in a double-page spread or the like on the assumption that the image is placed in that double-page spread.

Here, a parameter for deriving a score of an image alone for selecting an image to be used in a double-page spread will be referred to as the first parameter for convenience, and a parameter for deriving a score of an image taking into account the relativeness of that image placed in the double-page spread or the like will be referred to as "second parameter" for convenience. In this case, the double-page spread creation component 210 to be described next firstly selects candidate images usable in the double-page spread according to the first parameter. The double-page spread creation component 210 then determines images suitable for the double-page spread among the candidate images and also a suitable template or the like according to the second parameter. Here, the parameters are classified into the first parameter and the second parameter for convenience. Parameters comprehensively representing these will be collectively referred to as the double-page spread creation parameters.

The double-page spread creation component 210 creates double-page spread data by selecting images to be used in the double-page spreads and placing them according to the parameters generated by the double-page spread creation parameter generation component 209. For example, the double-page spread creation component 210 selects candidate images based on the first parameter. The first parameter is, as mentioned above, a parameter that changes a weight for each of the set main subjects and is also a parameter that applies a weight corresponding to a predetermined degree of priority. The degree of priority may be, for example, a degree of priority corresponding to the presence or absence of cropping. For example, since a common double-page spread tends to contain a plurality of main subjects, images of sizes that do not involve cropping may be prioritized, in order to prevent a main subject(s) from being left unselected. As for individual double-page spreads, it is considered that there may be only one main subject and cropping may be performed to get a close-up of the main subject. Thus, the priority of images that involve cropping does not have to be lowered.

Note that degrees of priority as above may be determined in advance or set by the user as appropriate. By preparing weights or threshold values corresponding to these degrees of priority, the user can change the parameters by changing the degree of priority for pieces of information. Also, such degrees of priority may be degrees of priority taking the above-mentioned information and also various other types of information into account. The various other types of information may include information on the scene of the image, information on the number of objects other than the main subject, the number of people other than the main subject, the resolution, the background, and so on.

The double-page spread creation component 210 then applies the second parameter to the score of each candidate image derived as described above to thereby derive a score, and creates each double-page spread such that the sum of the scores of the images placed in the double-page spread is high. The sum of the scores of the images placed in the double-page spread will be referred to as "the score of the double-page spread". The second parameter is a parameter taking relativeness in the double-page spread into account and, for example, enables images at certain time intervals to be preferentially used in the same double-page spread or enables a weight to be applied according to the slot size.

As mentioned earlier, the double-page spread creation parameters (first parameter and second parameter) are parameters different for common double-page spreads and individual double-page spreads. This allows images to be selected based on different double-page spread criteria, and therefore common double-page spreads and individual double-page spreads are created as different double-page spreads.

The double-page spread joining component 211 joins the pieces of double-page spread data created by the double-page spread creation component 210. Specifically, the double-page spread joining component 211 determines the order of the double-page spreads created by the double-page spread creation component 210 to create the entire layout of each album.

The layout information output component 212 outputs album data according to the entire layout of each album created by the double-page spread joining component 211. The album data is, for example, image data of a bitmap format in which images are placed according to predetermined layouts.

The album information output component 213 outputs album information used in the album creation. The album information contains, for example, album configuration information and album generation information. The album configuration information is configuration information forming an album such as used image information, image arrangement information, template information, slot shape-size information, background color information, cropping information, text/stamp editing information, and common/individual page information. The album generation information is generation information used in the generation of the album data such as the album creation conditions, the analysis information on the images, the score information, and the scene information. Incidentally, by generating an album with this album generation information, the same album can be generated. The album data itself may be contained in the album information. This information is output on an album-by-album basis.

The album display component 214 performs display control for displaying the bitmap data output by the layout information output component 212 on the display 105.

The album information holding component 215 receives and holds the album information output by the album information output component 213. In a case where an album is updated as a result of album editing or the like, the album information holding component receives and holds album information matching the update. The album information here contains album change information as well as the above-mentioned album configuration information and album generation information. The album change information may be, for example, a user operation history on album editing or difference information changed as a result of the album editing. These pieces of information are held on an album-by-album basis.

After the program of the album creation application in the present embodiment is installed in the image processing apparatus 100, this app's launch icon is displayed in the top screen (desktop) of the operating system (OS) running on the image processing apparatus 100. Upon a double-click on the launch icon in the desktop displayed on the display 105 by the user with the mouse 107, the program of the album creation application stored in the HDD 104 is loaded to the RAM 103. Then, the program loaded to the RAM 103 is executed by the CPU 101, so that the album creation application is launched. The above are the contents of the software configuration of the image processing apparatus in the present embodiment. Note that the application may be in a different form. For example, it may be a web app that displays screens and the like in a browser running on the image processing apparatus 100.

<GUI Screen>

Figure 4:
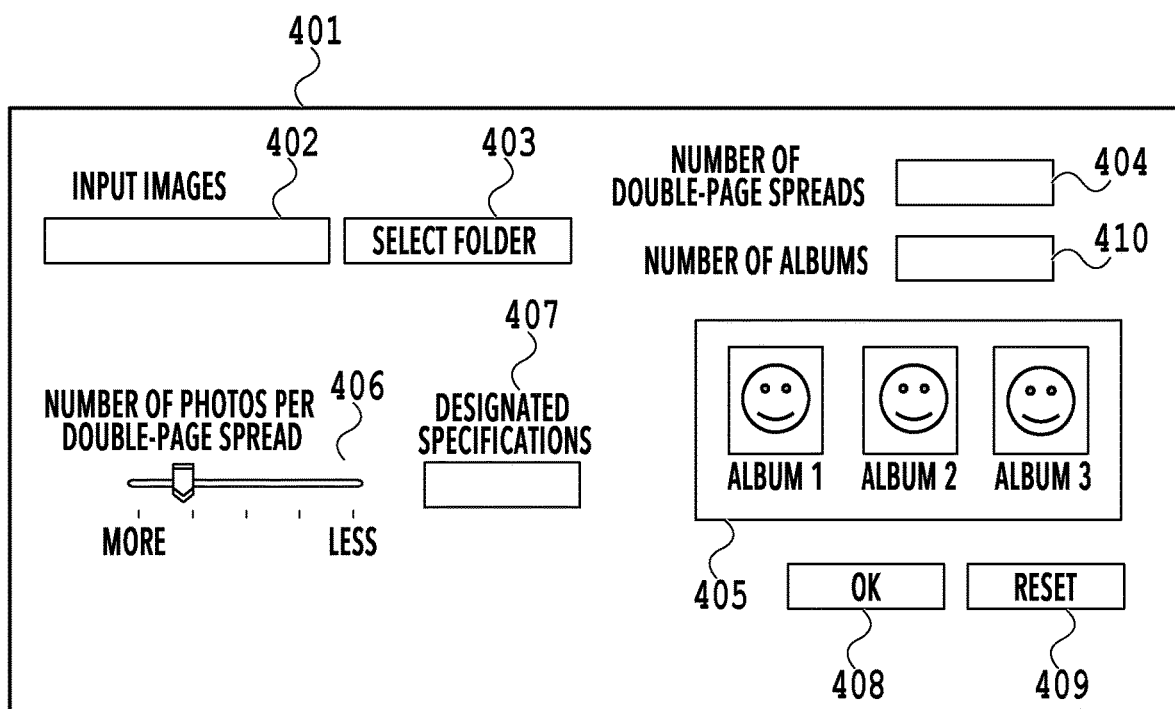
FIG. 4 is a diagram illustrating a display screen displayed by the application.

A GUI screen of the album creation application in the present embodiment will be described below using FIG. 4. FIG. 4 is a diagram illustrating a GUI screen 401 that is provided by the album creation application launched and is displayed on the display 105. The user can set the album creation conditions via the GUI screen 401.

The GUI screen 401 has a path box 402 and a folder selection button 403 as parts for setting photo images to be included in albums. The path box 402 is a box for indicating the storage location (path), in the HDD 104, of the image group to be used in the album creation. The folder selection button 403 is a button for selecting the folder containing the image group to be used in the album creation. In response to the user clicking the folder selection button 403 with the mouse 107, a tree including a plurality of folders is displayed. Then, in response to the user selecting the folder containing the image group to be used in the album creation, a folder path to the selected folder is displayed in the path box 402.

A double-page spread number box 404 is a box for designating the total number of double-page spreads per album. The user can directly enter a number into the double-page spread number box 404 with the keyboard 106 or enter a number into the double-page spread number box 404 from a list with the mouse 107. An album number box 410 is a box for designating the number of albums to be created.

A main subject designation part 405 is an element for designating the main subject to be emphasized in each of the number of albums entered in the album number box 410. For example, the user can designate the main subject by dragging an image with the main subject and dropping it into the main subject designation part 405 with the mouse 107. In one example, the person A, the person B, etc. mentioned above with reference to FIG. 3 are designated.

A double-page spread photo number setting part 406 is a slider bar for setting the number of images to be placed in each double-page spread in each album to be created. Moving the slider to "MORE" side increases the number of images to be placed in each double-page spread. On the other hand, moving the slider to "LESS" side decreases the number of images to be placed in each double-page spread.

A material designation part 407 is an element for setting material of the albums to be created. As specific items related to the material to be set, the size of the albums and the paper type of the albums can be employed. The type of the cover and the type of the binding part may be set as well.

An OK button 408 is a button for determining selected conditions as the album creation conditions. In response to the user clicking the OK button 408 with the mouse 107, the album creation conditions are fixed and transferred to the automatic layout processing component 202 via the album creation condition setting component 201. Specifically, the information on the path entered in the path box 402 is transferred to the image obtaining component 203. The value of the total number of double-page spreads entered in the double-page spread number box 404 is transferred to the double-page spread creation component 210. The value of the number of albums entered in the album number box 410 and the information on the main subject designated in the main subject designation part 405 are transferred to the double-page spread creation parameter generation component 209.

A reset button 409 is a button for resetting the setting contents in the display screen. The above are the contents of the GUI screen of the album creation application in the present embodiment.

<Automatic Layout Process>

An automatic layout process in the present embodiment will be described below using FIG. 5A. FIG. 5A is a flowchart of a process of executing automatic layout by the album creation application according to the present embodiment. Note that the CPU 101 implements the flowcharts illustrated in FIGS. 5A to 5C by reading out a program stored in the HDD 104 into the ROM 102 or the RAM 103 and executing it, for example.

In step S501, the album creation condition setting component 201 sets the album creation conditions. In the following, "step S_" will be abbreviated simply as "S_". In the present embodiment, the image group to be used for each album, the number of double-page spreads, the number of albums, the main subject of each album, whether the number of images to be placed in each double-page spread is large or small, and the material with which to create the albums are set as the album creation conditions (see FIG. 4).

In S502, the image obtaining component 203 reads an image satisfying the conditions for the image group to be used for the albums set in S501 from the HDD 104. The image obtaining component 203 then loads the read image into the RAM 103.

In S503, the image analysis component 204 analyzes the image loaded in the RAM 103 in S502. Here, the image analysis in this step will be described using FIG. 5B.

In S50301, the image analysis component 204 obtains information on the image capture date and time of the piece of image data obtained by the image obtaining component 203. In the present embodiment, the image analysis component 204 obtains the information on the image capture date and time of the piece of image data based on the Exif information attached to it.

In S50302, the image analysis component 204 derives an image-quality feature amount of the piece of image data obtained by the image obtaining component 203. The image-quality feature amount is, for example, in-focus degree. An edge detection method can be used as a method of determining the in-focus degree, and a publicly known Sobel filter can be used as the edge detection method. The Sobel filter may be used to detect edges in the image, and the difference in luminance between the start and the end of each edge may be divided by the distance between the start and the end to calculate the luminance gradient, i.e., the gradient of the edge. By calculating the average gradient of the edges in the image, an image with a large average gradient can be determined to be in sharper focus than an image with a small average gradient. In the present embodiment, a plurality of threshold values are set for measuring the degree of the calculated average gradient of the edges. By determining which threshold value the calculated gradient of the edges is greater than or equal to, whether the degree is an acceptable in-focus degree is determined. Specifically, as two different gradient threshold values, a first gradient threshold value and a second gradient threshold value (note that first gradient threshold value> second gradient threshold value) are set to determine the in-focus degree by three levels of A, B, and C. In a case where the average gradient of the edges in the image is greater than or equal to the first threshold value, the in-focus degree is a preferred in-focus degree (indicated as A). In a case where the average gradient of the edges in the image is less than the first threshold value and greater than or equal to the second threshold value, the in-focus degree is an acceptable in-focus degree (indicated as B). In a case where the average gradient of the edges in the image is less than the second threshold value, the in-focus degree is an unacceptable in-focus degree (indicated as C).

In S50303, the image analysis component 204 detects objects in the piece of image data obtained by the image obtaining component 203 and also classifies the detected objects. In the present embodiment, faces are detected as the objects. Here, any publicly known method is usable as a face detection method. For example, AdaBoost, which creates a strong classifier from a plurality of prepared weak classifiers, can be used as such a publicly known method. In the present embodiment, a strong classifier created by AdaBoost is used to detect the faces of persons. In S50303, while detecting faces, the image analysis component 204 also obtains an upper left coordinate value and a lower right coordinate value of the region of each face in the image. Deriving these two coordinate values makes it possible to specify the position and size of each face. Further, AdaBoost that detects animals such as dogs and cats and dishes like that for the faces of persons is also executed. In this way, it is possible to detect objects including persons, animals, and dishes and also classify the objects in the image. Note that the objects to be detected are not limited to the above, and may be flowers, buildings, stationary articles, or the like. Also, while a case of using AdaBoost to detect (and classify) objects has been described here, a learned model with a neutral network or the like may be used to detect (and classify) objects.

In S50304, the image analysis component 204 performs personal recognition on the faces detected by the image analysis component 204. Firstly, the image analysis component 204 performs derives the degree of similarity between each extracted facial image and representative facial images stored in association with personal IDs in a face dictionary database. Then, the personal ID whose degree of similarity thus derived is greater than or equal to a predetermined threshold value and is the highest is determined as an ID corresponding to the extracted facial image. That is, the person corresponding to the personal ID whose degree of similarity is greater than or equal to the predetermined threshold value and is the highest is specified as the person of the extracted facial image. The image analysis component 204 obtains the degree of similarity of each facial image in the process target image for each of the plurality of representative facial images. Note that in a case where all of the degrees of similarity derived for the respective personal IDs are less than the predetermined threshold value, the person of the extracted facial image is assumed as a new person, and a new personal ID is assigned and registered in the face dictionary database. The face dictionary database is stored in the HDD 104, for example.

The description now returns to FIG. 5A. In S504, the image analysis component 204 determines whether the processes in S502 to S503 have been completed for all images in the image group satisfying the conditions set in S501. In a case where the result of the determination in this step is positive, the flow proceeds to S505. On the other hand, in a case where the result of the determination is negative, the flow returns to S502.

In S505, the scene division component 206 performs scene division on the image group obtained by the image obtaining component 203. The scene division refers to the division of the obtained image group into a plurality of sub image groups by using image information. Specifically, by using the information on the image capture date and time obtained in S50301 as the image information, the image group is divided into a plurality of sub image groups based on the time difference between the image capture dates and times of images. An example of the actual division is as follows.

Figure 6:
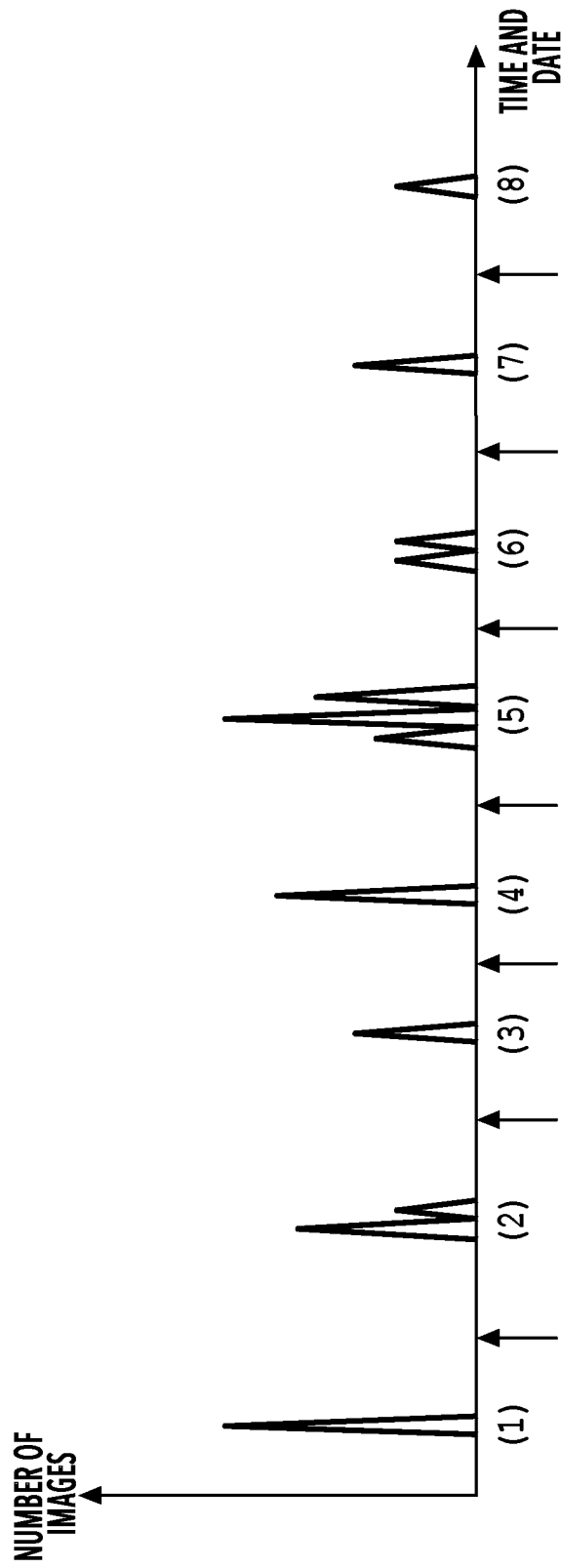
FIG. 6 is a diagram explaining image group division.

Focusing firstly on the image with the oldest (or newest) image capture time in the image group, its time difference from the next oldest (newest) image is calculated, and whether or not the calculated time difference is greater than or equal to a predetermined threshold value is determined. Such a process is performed on all images by sequentially switching the image of interest to an image with a newer (or older) image capture time. Note that "division" in the present embodiment means dividing the image group such that each two images are sorted as a newer one and an older one based on their image capture time. In the present embodiment, in a case where the difference between the image capture time of the image of interest and the image capture time of the next oldest (newest) image is 16 hours or longer, the image group is divided such that these images belong to different sub image groups. Note that the threshold value for the time difference to be used in the division is not limited to the above value. FIG. 6 illustrates the result of division of an image group by the above scene division method.

Incidentally, in the present embodiment, the information on the image capture date and time is used to perform the scene division, but the information to be used is not limited to this one. For example, information on the image capture location may be used to divide the image group such that images captured at near locations belong to the same scene. In another example, a personal recognition result may be used. For example, yearbook images of students belonging to a given group (class, club, etc.) may be registered in the application in advance, and an image group as a batch of images with any of the students belonging to the group may be considered a single scene (sub image group). In still another example, information other than the image information may be used. Here, a method of gathering similar events as a single scene will be described. The name of a folder storing images or tag information attached to them in a social networking service or the like is obtained as meta information attached to the images. For example, with search words such as "sports meeting" or "school trip", an image group with meta information containing the search words is considered a single scene. To designate search words, the user may select ones from among search words pre-incorporated in the application via the album creation condition setting component 201, or enter search words into a text box.

In S506, the scene classification component 207 performs scene classification on each of the sub image groups obtained in S505. Note that the following will exemplarily describe a case of classifying each sub image group (each scene) into one of three categories of "trip", "daily life", and "ceremony", but the classification items are not limited to these.

Firstly, a plurality of sub image groups each determined in advance to be classified as trip, daily life, or ceremony are obtained and, for each of the plurality of sub image groups thus obtained, image-capture feature amounts are obtained. The image-capture feature amounts obtained here are, for example, the image capture period, the number of images captured, and the number of people photographed. The image capture period is the time difference between the image capture time of the oldest image among the images included in the sub image group and the image capture time of the newest image among the same. The number of images captured is the number of images (i.e., the number of photos) included in the sub image group. The number of people photographed is the number of faces in the images with a face(s), and is the number of faces per image. With the plurality of sub image groups, the average value and standard deviation of the image capture periods, the average value and standard deviation of the numbers of images captured, and the average value and standard deviation of the numbers of people per image are derived. Note that in the present embodiment, the number of faces per image is assumed as the number of people per image.

FIG. 7 illustrates an example of the average and standard deviation of the image capture periods (times), the average and standard deviation of the numbers of images captured, and the average and standard deviation of the numbers of people per image derived with the plurality of sub image groups. These values derived are incorporated in the program of the album creation application in advance. That is, at the stage of designing the application, parameters are generated by learning using images collected in advance, and the generated parameters are incorporated in the program. After the album creation application is launched, the average values of the image capture periods, the numbers of images captured, and the numbers of people per image are calculated with the sub image groups obtained as a result of the division in S505 of the image group designated by the user via the path box 402. Then, scores are calculated for each scene by following the equations below with the above-mentioned parameters pre-incorporated in the app (specifically, the average value and standard deviation of each feature amount, or the image capture period, the number of images captured, and the number of people photographed, of the sub image groups).

Score for Each Scene and Each Feature Amount=50−|10×(Average Value of Feature Amount for Scene−Feature Amount of Each Sub Image Group)/Standard Deviation of Feature Amount for Scene|    Equation (1)

Average Score for Each Scene=(Score for Image Capture Period for Scene+Score for Number of Images Captured for Scene+Score for Number of People Photographed for Scene)/Number of Items as Feature Amounts    Equation (2)

By Equation (1), the score of the sub image group of interest for each feature amount is derived for each scene. For example, the scores for the image capture period, the number of images captured, and the number of people photographed are derived for trip scene. These scores are averaged by Equation (2) as a score for trip scene. The scores for the other scenes, namely, daily life scene and ceremony scene, are obtained in a similar manner as well. By the method described above, an average score for trip scene, an average score for daily life scene, and an average score for ceremony scene are calculated for each sub image group. Note that the number of items as feature amounts in Equation (2) is 3.

Of the scenes scored for each sub image group, the scene with the highest score is classified as the scene of this sub image group. In a case where two or more scenes are given the same score, scene classification is performed according to their degrees of priority set in advance. For example, in the present embodiment, the order of priority is determined in advance as daily life>ceremony>trip, so that daily life has the highest priority. Note that the order of priority is not limited to the above, and also the configuration may be such that the user can change the order of priority.

Sub image groups (1) to (8) in FIG. 6 represent the sub image groups obtained by the scene division of the image group. Assume that, with the sub image group (5) among these sub image groups, the image capture period is 36 hours, the number of images captured is 300, and the number of people photographed is 1.7. Assume also that, with these, the average score is 45.32 for trip, 18.38 for daily life, and −29.92 for ceremony. In this case, the scene of the sub image group (5) is classified as trip. The sub image group thus classified is managed in association with a scene ID so that its scene can be identified. Note that in the present embodiment, a case of employing the image capture period, the number of images captured, and the number of people photographed as the image-capture feature amounts has been described, but the image-capture feature amounts are not limited to these. For example, with image segmentation using machine learning, a flag indicating, for example, whether sky is in the image may be employed as a feature amount in order to identify whether the scene is indoor or outdoor. Alternatively, ceremony may be classified further into more specific categories. For example, consider a case of classifying a scene as a wedding ceremony or a wedding reception. In this case, by using a personal recognition result, the two persons appearing most frequently among all images are assumed as the bride and groom. Then, a scene containing many images with only the bride and groom may be classified as the wedding ceremony, while a scene containing many images with the bride and groom and also other people with them may be classified as the wedding reception. Further, the feature amounts may be derived by machine learning. For example, a scene desired to be classified and an image group representing this scene may be prepared, and a convolution neural network (CNN) may be used to perform learning such that each image is an input and the result of scene classification thereof is an output.

In S507, the main subject setting component 205 sets the main subject of each album. In the present embodiment, the main subject setting component 205 obtains information on each album's main subject sent from the album creation condition setting component 201. An example of creating three types of albums has been generally described in the present embodiment. However, for a simple description, an example of setting the main subjects of two types of albums will be described below in which the main subject A is set for the album 1 and the main subject B is set for the album 2.

In S508, the image scoring component 208 scores an image. This process will be referred to as the image scoring process. "Scores" to be derived in this step are parameters for evaluating the suitability of use in an album(s). Each piece of image data is given scores based on an evaluation from the points of view to be described later, and these scores are referred to in the image selection to be described later. In the present embodiment, a score is given for each main subject set in S507, in addition to a score based on the degree of image quality. Firstly, a score corresponding to the image-quality feature amount derived in S50302 is given. In this example, 1 point is given in a case where the in-focus degree is A (good), 0.5 point is given in a case of B (acceptable), and 0 point is given in a case of C (unacceptable). In this way, an in-focus image can be scored high. Note that in the present embodiment, the in-focus degree is employed as the image-quality feature amount, but the image-quality feature amount is not limited to this one. For example, the image size may be used, photographic information such as information on the lens used to capture the image may be used, or the compression format of the image input into the application may be used.

After giving the score corresponding to the image-quality feature amount, the image scoring component 208 gives a score for each set main subject. That is, in this example, each single image is given three types of scores, specifically, scores based on an evaluation from three points of view of: whether the image quality is good; whether the main subject A is in the image; and whether the main subject B is in the image. For the scoring for each main subject, it is possible to use the size of the face(s) derived in S50303 and the result of the personal recognition in S50304. In a case where the main subject is not in the image, 0 point is given. In a case where the main subject is in the image, the ratio of the face of the person set as the main subject to the image size is set as the score for the main subject. Note that in the present embodiment, the score for each main subject is given by using the facial size, but something other than the facial size may be used. For example, the facial expression of the person set as the main subject may be determined, and a point(s) may be given in a case where the person is smiling. Also, in a case where non-human main subjects are set, the result of the object detection and classification in S50303 is used to perform scoring similarly according to the object size. By the above process, the score for the image quality, the score for the main subject A, and the score for the main subject B are calculated for the first image, for example. For an image with the main subject A and without the main subject B, for example, a score is calculated from each point of view such that the score for the image quality is 1 point, the score for the main subject A is 1 point, and the score for the main subject B is 0 point.

In S509, the image scoring component 208 determines whether the scoring in S508 has been completed for all images in the image group obtained by the image obtaining component 203. In a case where the result of the determination in this step is positive, the flow proceeds to S510. On the other hand, in a case where the result of the determination is negative, the flow returns to S508.

In S510, the double-page spread creation parameter generation component 209 receives the album creation conditions from the album creation condition setting component 201 and also receives information on the main subject of each album from the main subject setting component 205, and generates the double-page spread creation parameters. As mentioned earlier, the double-page spread creation parameters are setting values to be used to select the constituent images of double-page spreads and to lay them out. For example, the double-page spread creation parameter generation component 209 generates a weight for controlling whether to prioritize the score for the image quality or to prioritize the score for each main subject in the selection of images to be used in the double-page spreads based on the scores given to each image in S508, a threshold value that serves as a reference point for image selection, or the like. The double-page spread creation parameter generation component 209 generates a "common parameter" which is common to all albums and an "individual parameter" which is different for each album as the double-page spread creation parameters. Specifically, the double-page spread creation parameter generation component 209 generates (the number of albums+1) double-page spread creation parameters. In this way, it is possible to create a "common double-page spread" which has the same constituent images in the same arrangement and appears in the plurality of albums, and "individual double-page spreads" each of which has specific constituent images in a specific arrangement and appears in a specific album. Moreover, by using each of these double-page spread creation parameters (first parameter), the double-page spread creation component 210 derives a representative score of each image from the scores given to the image in S508 (in this example, the three types of scores). That is, for each single image, the same number of scores as the number of double-page spread creation parameters are derived. Moreover, the scores thus derived are used to select the images to be placed in the double-page spreads. For example, in the creation of the double-page spreads, the score of an image X obtained by using the common parameter and the score of the image X obtained by using each individual parameter are different. In the following, the double-page spread creation parameters and an example of deriving the scores of an image by using the double-page spread creation parameters in the creation of double-page spreads will be described.

In the present embodiment, as the common parameter, a weight is set such that the scores given to the image are evaluated evenly. A representative score $^I score_s$ of an image I in a case of using a common parameter $w_i$ is represented by Equation (3) below.

$$^I score_S = \Sigma_i w_i {}^I score_i \qquad \text{Equation (3)}$$

Here, $^I score_i$ represents the i-th score given to the image I, and $w_i$ represents the weight for each score. In the present embodiment, $w_i = 1/3$ is set to evenly evaluate the score for the image quality, the score for the main subject A, and the score for the main subject B. In this way, an image which has higher image quality and in which more people with higher scores appear is prioritized. This example assumes that a score corresponding to a type of priority mentioned earlier, such as whether cropping has been performed, has been reflected in the score for the image quality.

On the other hand, as each individual parameter, weights for prioritizing an image with the main subject of the corresponding album is set. A representative score $^I score_1$ of an image I in a case of using an individual parameter $w_o$ is represented by Equation (4) below.

$$^I score_I = \begin{cases} 0 & (^I score_o = 0) \\ \dfrac{w_q \cdot {}^I score_q + w_o \cdot {}^I score_o}{2} & (\text{otherwise}) \end{cases} \quad \text{Equation (4)}$$

Here, $^I score_q$ represents the score for the image quality given to the image I, $^I score_o$ represents the score for a main subject O given to the image I, $w_q$ represents a weight for the score for the image quality, and $w_o$ represents a weight for the main subject O. In the present embodiment, $w_q = w_o = 1$ is set. In this way, only the images with the main subject are evaluated, and the images to be prioritized are determined by the image quality and the size of the main subject. Note that, in the present embodiment, weights to be applied to scores are used as the double-page spread creation parameters, but the double-page spread parameters are not limited to these. Also, $^I score_S$ and $^I score_1$ are both derived such that the scores are high in the case where the main subject is in the image, but are not limited to these. For an image in which the main subject does not appear at all, such as a scenic image, its score may be calculated based, instead, on the score for the image quality, image information, or the like. For example, for an image whose difference in image capture time from a high-score image is small, the score for the image quality may be used as its representative score. In this way, an image that is likely to be associated with an image with the main subject can be scored high. Also, the score may be derived with such an association or the like specified as a weight.

In S511, the double-page spread creation component 210 creates double-page spread data of each album by using the parameters generated in S510. The double-page spread creation component 210 creates the double-page spread data such that the score of each double-page spread will be high. The score of a double-page spread is a score obtained by summing the scores of the images in the double-page spread, as mentioned earlier. Specifically, it is the sum of scores obtained by multiplying the scores of the images obtained according to the first parameter by the second parameter. Note that, as mentioned earlier, the score of a double-page spread is, for example, the sum of the scores of its images each multiplied by a weight corresponding to the size of the slot for placing the image. In this example, firstly, candidate images are determined followed by layout which involves determining their slots and arrangement. In this way, a high-score double-page spread is created. Here, the double-page spread creation process in this step will be described using FIGS. 2B and 5C. FIG. 2B is a detailed block diagram of the double-page spread creation component 210. FIG. 5C is a detailed flowchart of the double-page spread creation in S511.

In S51101, a double-page spread creation parameter setting component 21001 reads one of the parameters generated in S510. In the present embodiment, the parameters are read in turn in the order of the individual parameter for the album 1, the individual parameter for the album 2, and the common parameter.

In S51102, based on the scores given in S508 and the double-page spread creation parameter set in S51101, a double-page spread candidate image obtaining component 21002 obtains candidate images usable in the double-page spread(s) from the entire image group obtained by the image obtaining component 203. In the present embodiment, based on the scores derived in S508 and the double-page spread creation parameter set in S51101, each image is scored again in a manner described above by following Equation (3) or (4) (re-scoring of each image). Then, images whose score obtained as a result of the re-scoring is greater than or equal to a predetermined threshold value are obtained as candidate images. Specifically, in S51102 in the first round in this example, each image is re-scored using the individual parameter for the album 1. Then, images whose score obtained by using the individual parameter for the album 1 is greater than or equal to a predetermined threshold value are obtained as candidate images. In a case where there is no candidate image, the image with the highest score is set as a candidate image. Note that the candidate images are obtained from the entire image group, but the configuration is not limited to this case. The images already selected in the image selection process to be described later may be excluded.

In S51103, a double-page spread number setting component 21003 determines whether the double-page spread creation parameter set in the recent S51101 is an individual parameter. In a case where the result of the determination in this step is positive, the flow proceeds to S51104. On the other hand, in a case where the result of the determination is negative, the flow proceeds to S51105.

In a case of YES in S51103 (that is, in a case where an individual parameter has been set in the recent S51101), the flow proceeds to S51104. In S51104, the double-page spread number setting component 21003 sets the number of double-page spreads (i.e., the number of individual double-page spreads corresponding to the individual parameter set in S51101) based on the result of the scene division performed in S505 and the candidate images obtained in S51102. In the present embodiment, the number of double-page spreads is set by following Equation (5) or (6) below.

Number of Double-Page Spreads for Each Scene=ceil(Number of Candidate Images in Scene÷Maximum Number of Images per Double-Page Spread)     Equation (5)

Number of Individual Double-Page Spreads=ΣNumber of Double-Page Spreads for Each Scene     Equation (6)

By Equations (5) and (6), the number of double-page spreads to be created with the individual parameter is derived. The maximum number of images per double-page spread is set based on a user input via the double-page spread photo number setting part 406. For example, in a case where the scene division has been done as illustrated in FIG. 6, the number of double-page spreads for each scene is determined according to the number of candidate images in the scene. Each scene always contains an image(s) obtained by the image obtaining component 203 but does not always contain a candidate image(s) (a candidate image(s) obtained as a result of the re-scoring based on the individual parameter). In this process (the process corresponding to the individual parameter), the number of double-page spreads is 0 for a scene containing no candidate image, as a matter of course. On the other hand, a scene containing many images with the main subject corresponding to the individual parameter is allocated a corresponding number of double-page spreads. Note that in a case where the number of individual double-page spreads is greater than or equal to the total number of double-page spreads set in S501, Equation (7) below is applied.

Number of Individual Double-Page Spreads=Total Number of Double-Page Spreads−1     Equation (7)

By Equation (7), double-page spreads created with different parameters, or the individual parameter and the common parameter, can both be contained within a single album. Thus, the number of individual double-page spreads can be set on a scene-by-scene basis according to the number of images in which the main subject appears with high image quality. Note that an upper limit value and a lower limit value may be set for the number of individual double-page spreads.

On the other hand, in a case of NO in S51103 (i.e., the common parameter has been set in the recent S51101), then in S51105, the double-page spread number setting component 21003 sets the number of double-page spreads by following Equation (8) below.

Number of Common Double-Page Spreads=Total Number of Double-Page Spreads−MIN(Total Number of Individual Double-Page Spreads in Each Album)　　　　Equation (8)

By Equation (8), it is possible to set a number of common double-page spreads that is adjusted to both the number of individual double-page spreads and the total number of double-page spreads. Incidentally, according to Equation (8), the number of common double-page spreads is derived according to the number of individual double-page spreads in the album having the smallest number of individual double-page spreads. Hence, for the other album, the sum of the number of individual double-page spreads in that album and the number of common double-page spreads by Equation (8) exceeds the total number of double-page spreads that has been set. The processing in this case is such that an adjustment is made in the double-page spread joining process to be described later.

Note that a case of setting the number of double-page spreads according to the number of candidate images has been described above, but the method of setting the number of double-page spreads is not limited to this method. For example, the double-page spread creation parameter generation component 209 may set the number of double-page spreads in a parameter, and the double-page spread number setting component 21003 may read the number of double-page spreads set in the parameter. Also, for example, the double-page spread creation parameter generation component 209 may set a given number of double-page spreads pre-incorporated in the program of the album creation application, or calculate the number of double-page spreads based on a user-designated ratio of individual double-page spreads and common double-page spreads. The number of individual double-page spreads and the number of common double-page spreads have been described together above. In the following, the description of the processing for each parameter set in S51101 will be continued.

In S51106, a double-page spread allocation component 21004 divides the candidate images obtained in S51102 (i.e., candidate images corresponding to the process-target double-page spread creation parameter) into the same number of sub image groups as the number of double-page spreads set in S51104 or S51105, and allocates them. In the present embodiment, the candidate images are sorted in order of the image capture time obtained in S50301 and divided at a point where the time difference between the image capture times of neighboring images is large. Such a process is performed until the candidate images are divided into the number of double-page spreads set in S51104 or S51105. In other words, the division is performed (the number of double-page spreads−1) times. In this way, albums in which images are arranged in order of image capture time can be created. In sum, although division as explained in FIG. 6 is performed, the division differs from the example explained in FIG. 6 in that the image group to be divided is a candidate image group corresponding to the process-target double-page spread creation parameter obtained in S51102. Note that the process in S51106 may be performed on a scene-by-scene basis. For example, the double-page spread allocation component 21004 sorts images allocated as a trip scene among the candidate images in order of candidate time and divides them. The double-page spread allocation component 21004 subsequently arranges images allocated as a daily life scene in order of candidate time and divides them. The double-page spread allocation component 21004 may perform a division process while switching the scene as described above.

In S51107, from the candidate image group(s) allocated to a process-target double-page spread in S51106, a double-page spread image selection component 21005 selects images to be used in the layout. At this point, the number of candidate image groups allocated to the process-target double-page spread may be greater than the maximum number of images per double-page spread. The number may of course be equal or smaller. That is, the images to be used in the layout have not been determined and thus a process of selecting the images to be used in the layout is performed in S51107. In the following, a case of selecting four images from a candidate image group allocated to a given double-page spread will be exemplarily described using FIGS. 8A to 8I.

Figure 8:
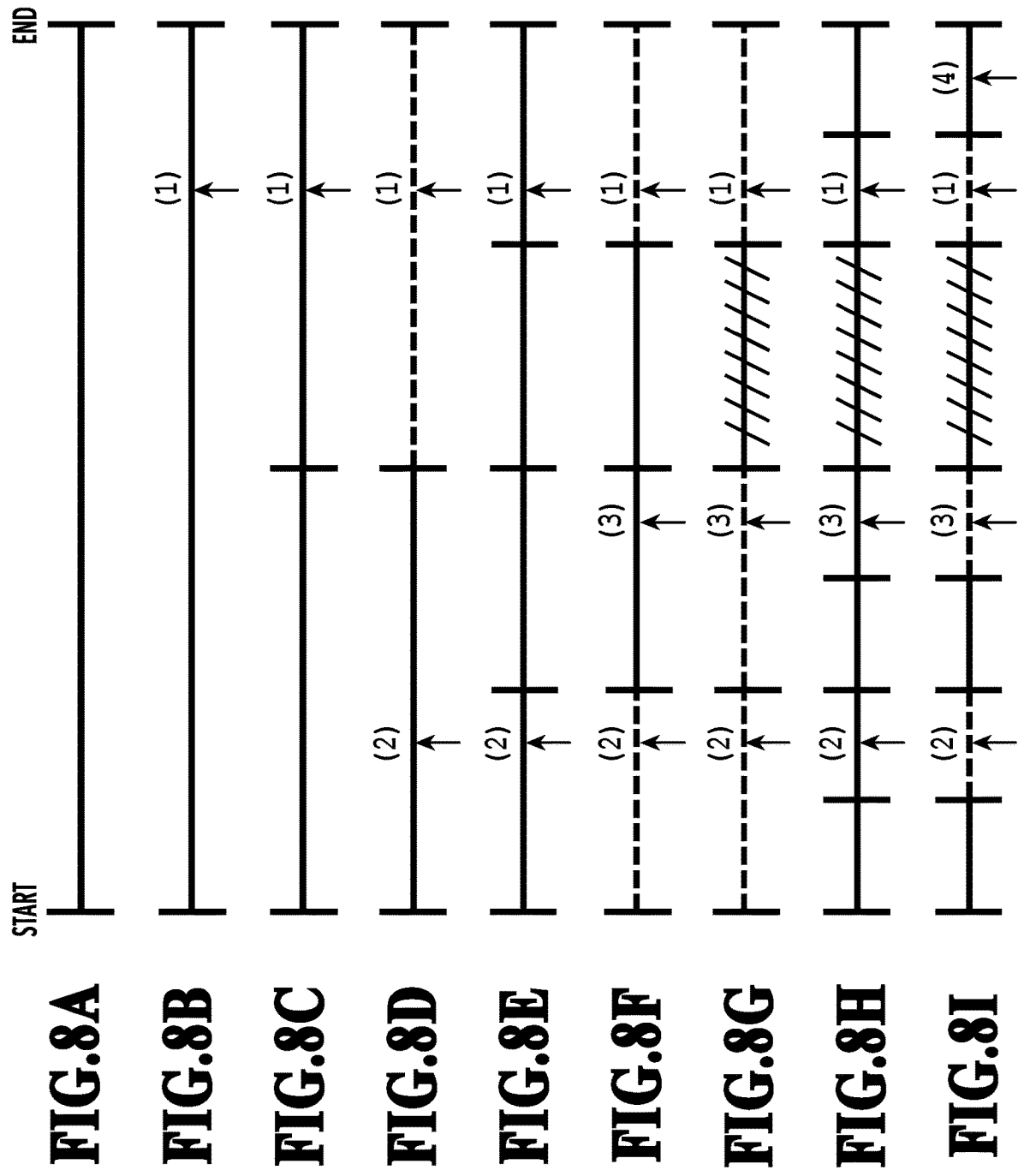
FIGS. 8A to 8I are diagrams explaining image selection.

FIG. 8A illustrates the time difference between the image capture dates and times of the first and last images included in the candidate image group allocated to the double-page spread, in other words, the image capture period of the candidate image group. A method of selecting the first image in the case of selecting four images will be described using FIG. 8B. Of all images captured in the image capture period of the candidate image group illustrated in FIG. 8B, the image whose score obtained by the re-scoring in S51102 is the highest is selected as the first image. In the selection of the second and subsequent images, the image capture period of the candidate image group is segmented and the images are selected from the segmented periods to prevent the images from being selected concentratedly from one part of the image capture period of the candidate image group. Firstly, as illustrated in FIG. 8C, the image capture period of the candidate image group is divided into two image capture sections (periods). Specifically, the image capture period is divided in half into two image capture sections (divided into two groups). Then, as illustrated in FIG. 8D, from among the images belonging to the image capture section where the first image was not selected (the solid-line section), the image with the highest score is selected as the second image. Then, as illustrated in FIG. 8E, the image capture sections in FIG. 8D are each divided in half. From among the images captured in the image capture sections illustrated with the solid lines in FIG. 8F, i.e., the two image capture sections where neither the first image nor the second image was selected (the images corresponding to the two image capture sections), the image with the highest score is selected as the third image.

Next, a case where there is no image in the image capture section from which an image is supposed to be selected and thus no image can be selected will be described by taking the selection of the fourth image as an example. In the present embodiment, the image capture period is divided according to time, regardless of the number of images. This may lead to a case where there is no image in an image capture section obtained by the division. For example, assume that, as illustrated in FIG. 8G, the fourth image should be selected from the image capture section where no image has been selected (the image capture section illustrated with the diagonal lines) but there is no image in this image capture section. In such a case, as illustrated in FIG. 8H, each image capture section where an image has been selected is divided into two sections. Then, as illustrated in FIG. 8I, from among the images captured in the image capture sections illustrated with the solid lines in FIG. 8I, from which none of the first to third images was selected, the image with the highest score is selected as the fourth image. Even in a case where the number of images to be selected is increased or decreased from four, the images are selected in a similar manner to the above.

The description now returns to FIG. 5C. In S51108, a template setting component 21006 selectively sets a plurality of templates to be used in the layout from among templates stored in the HDD 104. In this step, templates with designs satisfying the album creation conditions set in S501 are set.

Figure 9:
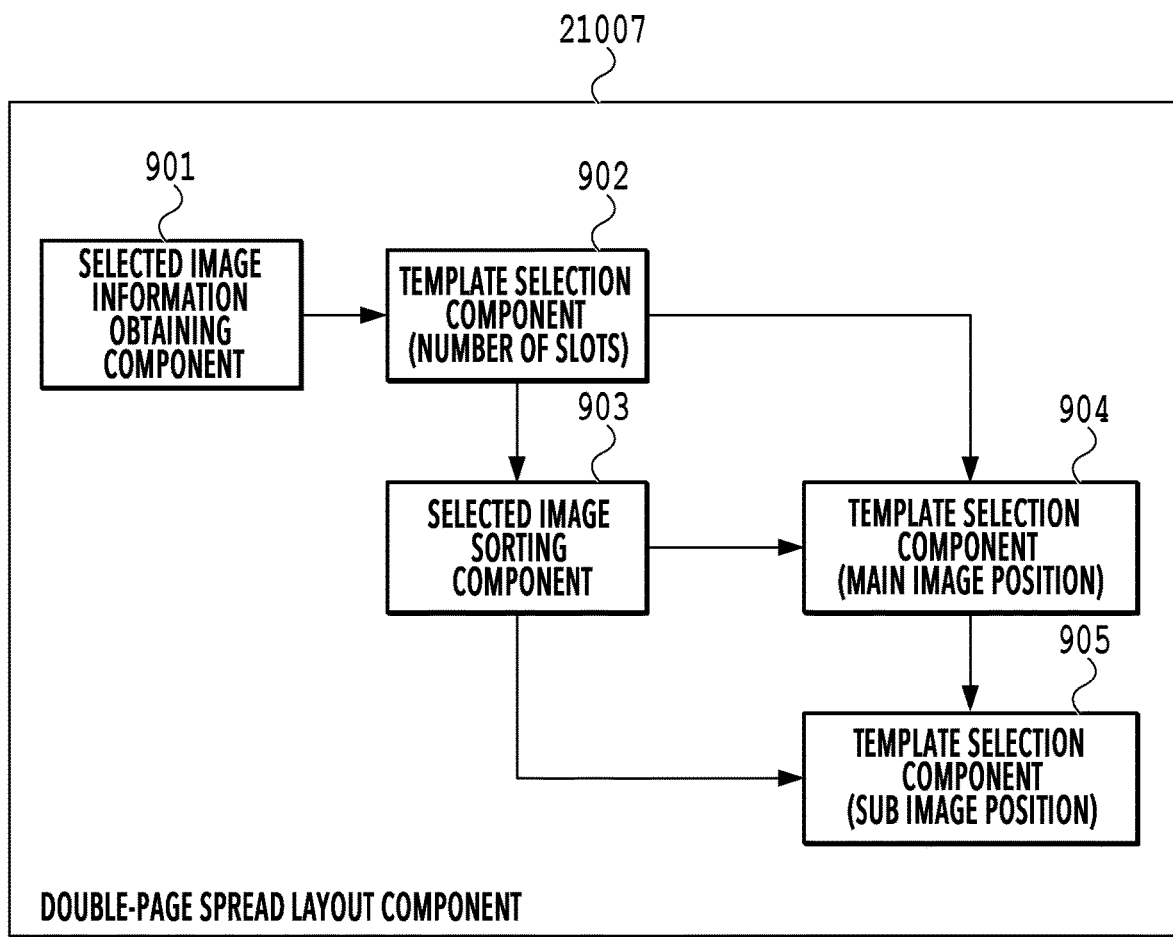
FIG. 9 is a block diagram of template selection.

In S51109, a double-page spread layout component 21007 determines the image layout of the process-target double-page spread. Specifically, the double-page spread layout component 21007 determines a template suitable for laying out the images selected in S51107 from among the plurality of templates set in S51108. Now, a method of determining the template in this step will be described using FIG. 9. FIG. 9 is a block diagram of functions related to the determining of the template.

Figure 10:
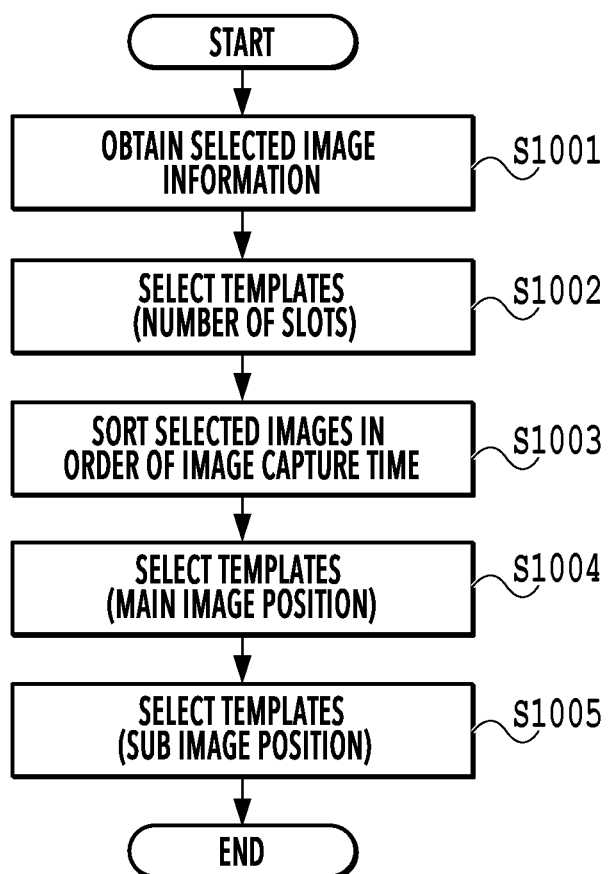
FIG. 10 is a process flow diagram of the template selection.

A selected image information obtaining component 901 obtains the number of images selected by the double-page spread image selection component 21005 and image information on each of these images. The image information obtained is the image's width and height, image capture date and time information, and scores calculated by the image scoring component 208. A template selection component 902 selects templates having the same number of slots as the number of selected images from among the templates set by the template setting component 21006. A selected image sorting component 903 sorts the selected images in order of image capture time. A template selection component 904 selects, from among the templates selected by the template selection component 902, templates in each of which the sequential position of its main slot to place a main image matches that of the main image arranged in order of image capture time. Here, "main image" refers to the image whose score obtained as a result of the re-scoring in S51102 is the highest among the plurality of images selected by the double-page spread image selection component 21005. Of the plurality of images, the images other than the main image are "sub images". In this template selection, not only a match between the sequential positions but also a match between the aspect ratio of the main image and the aspect ratio of the slot to place the main image is a condition for the selection. In the present embodiment, the older the image capture time of the image, the closer it is laid out to the upper left of the template, and the newer the image capture time of the image, the closer it is laid out to the lower right of the template. A template selection component 905 selects, from among the templates selected by the template selection component 904, a template in which its slots to place the sub images match the sequential positions of the sub images arranged in order of image capture time and the aspect ratios of the images and those of the slots match each other. FIG. 10 is a flowchart of the template determination process.

In S1001, the selected image information obtaining component 901 obtains selected image information. The selected image information obtained in this step contains the number of selected images. For the sake of description, the following assumes that the number of selected images is three.

Figure 11:
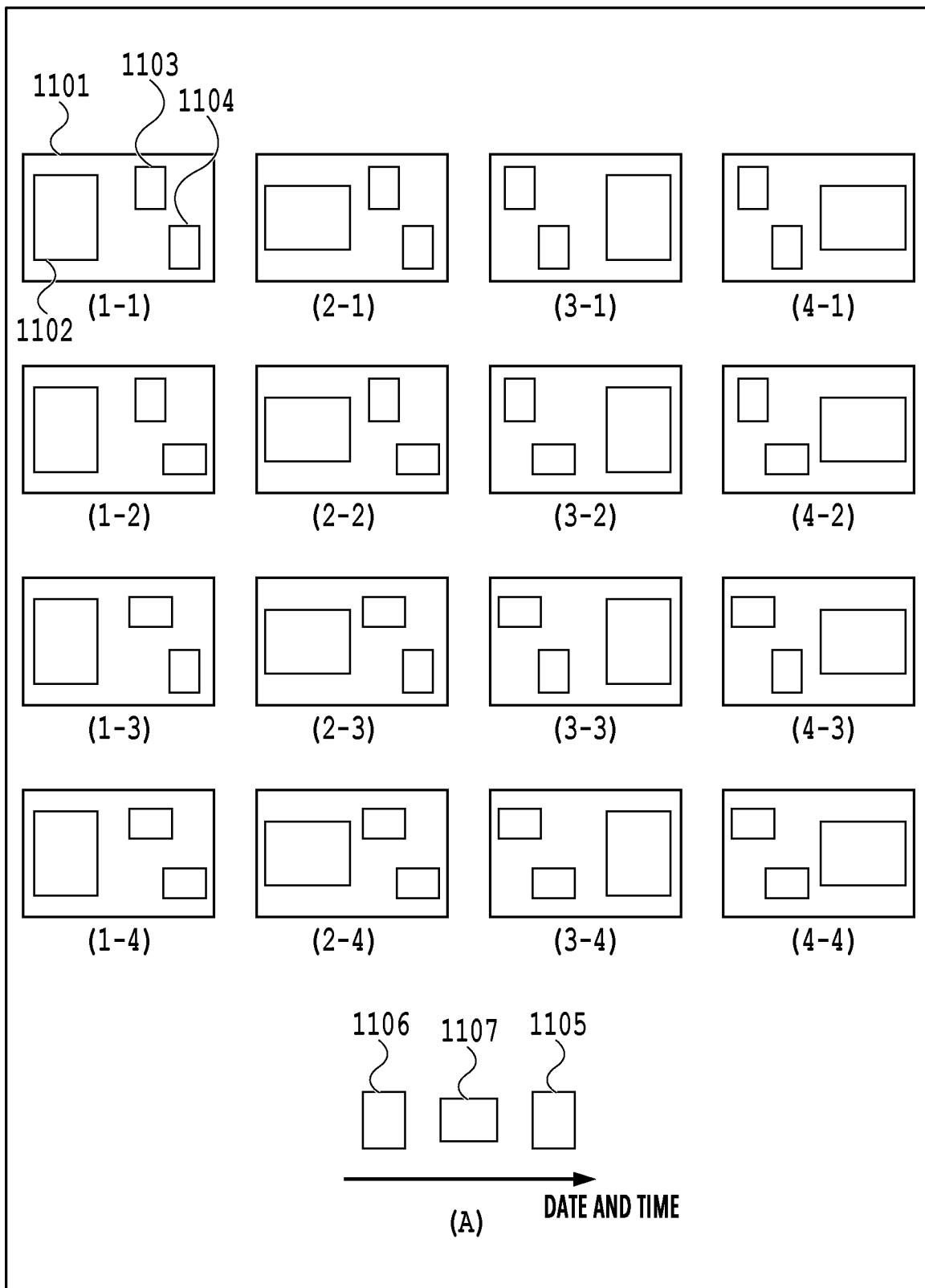
FIG. 11 is a diagram explaining image layouts.

In S1002, the template selection component 902 selects templates with the same number of slots as the number of selected images. This example assumes that the number of selected images obtained in S1001 is three and templates with three slots are selected. The following description will be given by taking as an example a case where templates (1-1) to (4-4) illustrated in FIG. 11 are selected in S1002.

In S1003, the selected image sorting component 903 sorts the selected images in order of image capture time. Here, assume that the relationship illustrated in (A) of FIG. 11 is obtained as a result of sorting the selected images in order of image capture time. Assume also that an image 1105 is the main image, and images 1106 and 1107 are the sub images.

In S1004, the template selection component 904 selects templates in each of which the position where its slot for the main image (hereinafter the main slot) is disposed matches the position where the main image is placed in the case of sorting in order of image capture time. Further, the template selection component 904 selects templates in each of which the aspect ratio of the main slot matches that of the main image. In this example, the image 1105 is the image for the main slot with the newest image capture time and is an image with a portrait aspect ratio. Thus, the templates (3-1) to (3-4) in FIG. 11 are candidate templates.

In S1005, the template selection component 905 selects a template in which the aspect ratios of its slots for the sub images (hereinafter the sub slots) match those of the sub images. In the example of FIG. 11, the older image 1106 for a sub slot, i.e., the image desired to be placed at the upper left is a portrait image, and the newer image 1107 for a sub slot is a landscape image. Thus, the template (3-2) is determined as the most suitable template for the three selected images. As a result, in S51109, the template to be used for the layout of the double-page spread and information capable of identifying which image to place in which slot in the template are determined. Note that the information thus determined will be referred to as the double-page spread data.

The description now returns to FIG. 5C. In S51110, the double-page spread layout component 21007 determines whether the processes in S51107 to S51109 have been completed for all process-target double-page spreads. In a case where the result of the determination in this step is positive, the flow proceeds to S51111. On the other hand, in a case where the result of the determination is negative, the flow returns to S51107.

In S51111, the double-page spread creation parameter setting component 21001 determines whether the processes in S51101 to S51110 have been completed for all parameters generated in S510. In a case where the result of the determination in this step is positive, the flow proceeds to S512. On the other hand, in a case where the result of the determination is negative, the flow returns to S51101.

The description now returns to FIG. 5A. In S512, the double-page spread joining component 211 determines a double-page spread identification number of each of the double-page spreads created by the double-page spread creation component 210 within the corresponding album, and creates the layout of the entire album. In the present embodiment, the double-page spreads are arranged based on the image capture times of the images placed in the double-page spreads such that the images appear in order of image capture time.

Figure 12:
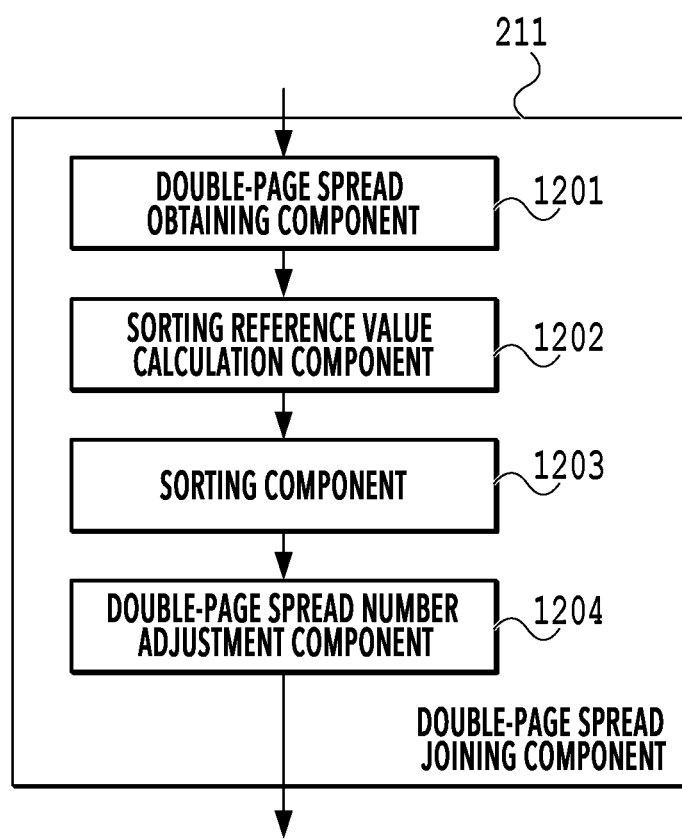
FIG. 12 is a block diagram of double-page spread joining.
Figure 13:
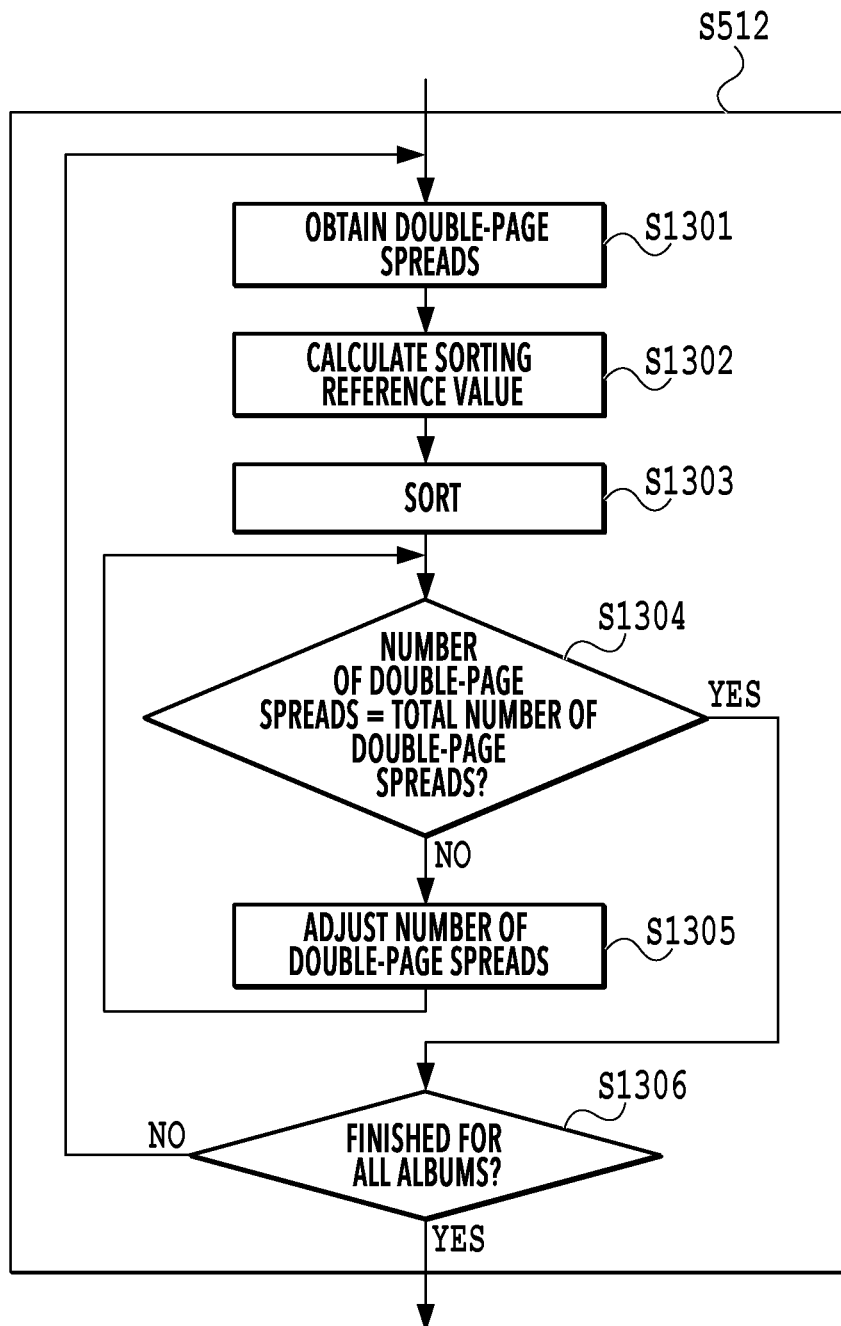
FIG. 13 is a process flow diagram of the double-page spread joining.

The joining of the double-page spreads in S512 will be described below in detail by using FIGS. 12 and 13. FIG. 12 is a block diagram illustrating a detailed configuration of the double-page spread joining component 211 in the present embodiment. FIG. 13 is a flowchart of a process executed by the double-page spread joining component 211.

In S1301, a double-page spread obtaining component 1201 obtains the double-page spread data on one album among the double-page spreads created by the double-page spread creation component 210. In the present embodiment, the double-page spread data on, for example, the album 1 obtained in this step includes pieces of double-page spread data created with the common parameter and pieces of double-page spread data created with the individual parameter for the album 1.

In S1302, for each piece of double-page spread data obtained by the double-page spread obtaining component 1201, a sorting reference value calculation component 1202 calculates a reference value for sorting. In the present embodiment, the sorting reference value is the average image capture time of the images placed in the piece of double-page spread data. Note that the sorting reference value is not limited to the image capture time. For example, it may be the average image capture location (latitude and longitude) of the images placed in the double-page spread or the number of images, or image analysis information, such as a color histogram, may be used.

In S1303, a sorting component 1203 sorts the pieces of double-page spread data obtained by the double-page spread obtaining component 1201 based on the sorting reference value calculated by the sorting reference value calculation component 1202. In the present embodiment, the sorting component 1203 sorts the double-page spreads in ascending order of average image capture time.

In S1304, a double-page spread number adjustment component 1204 determines whether the number of pieces of double-page spread data on the process-target album is the same as the total number of double-page spreads set in S501. In a case where the result of the determination in this step is positive, the flow proceeds to S1306. On the other hand, in a case where the result of the determination in this step is negative, that is, in a case where the number of double-page spreads in the process-target album has been set to be greater than or equal to the total number of double-page spreads in S51104 and thus the number of double-page spreads in the album exceeds the total number of double-page spreads, the flow proceeds to S1305.

In S1305, a double-page spread number adjustment component 1204 adjusts the number of double-page spreads in the album to bring it closer to the total number of double-page spreads set in S501 by deleting an unnecessary piece(s) of double-page spread data among the pieces of double-page spread data obtained by the double-page spread obtaining component 1201. In the present embodiment, the number of double-page spreads is adjusted by deleting a piece of common double-page spread data. Specifically, of the pieces of common double-page spread data in the album, the piece of common double-page spread data whose image capture time calculated by the sorting reference value calculation component 1202 is the closest to the image capture time of any of the pieces of individual double-page spread data is deleted. After the deletion, the flow proceeds to S1304. Note that in the present embodiment, a piece of common double-page spread data is deleted but the deletion target is not limited to this one. A piece of individual double-page spread data may be deleted to adjust the total number of double-page spreads.

In S1306, the double-page spread obtaining component 1201 determines whether the processes in S1301 to S1305 have been completed for all albums. In a case where the result of the determination in this step is positive, the flow proceeds to S513. On the other hand, in a case where the result of the determination is negative, the flow returns to S1301. In this way, images can be arranged in order of image capture time throughout each entire album. The above are the contents of the automatic layout process in the present embodiment. In the present embodiment, the numbers and positions of common double-page spreads and individual double-page spreads can be automatically set on an album-by-album basis. It is possible to implement automatic layout of a plurality of albums with different main subjects such that the plurality of albums have a common double-page spread(s) which is(are) the same for all albums and an individual double-page spread(s) which is(are) different for each album.

<<Album Data Editing Process>>
<General Description of Editing Process>

A description has been given so far of a process of automatically generating album data having a common double-page spread(s) and an individual double-page spread(s), each of which represents an attribute of double-page spread. In the following, functions of and processes by an album editing application with which a user can edit generated album data will be described. In the present embodiment, the description will be given on the assumption that the user who performs the editing is the same as the user who operates the album creation application, but they do not to be the same user. In the following, a general description of the album data editing process will be given first, and then detailed processes in the present embodiment will be described.

Figure 14:
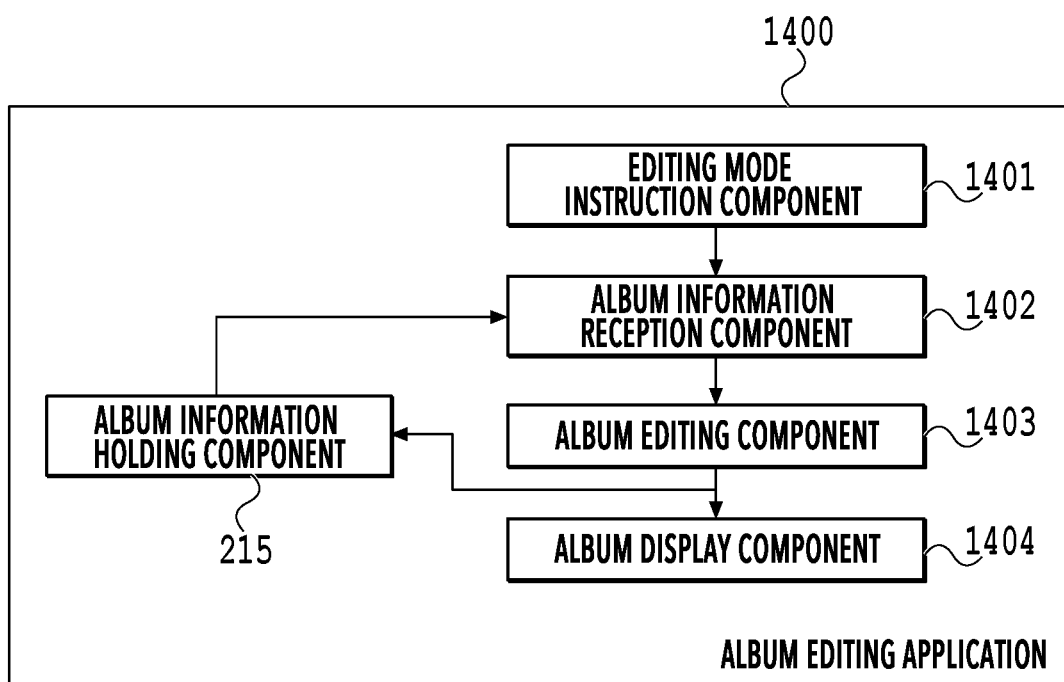
FIG. 14 is a software block diagram of an album editing application.

FIG. 14 is a software block diagram of an album editing application 1400 in the present embodiment. In the present embodiment, the album editing application 1400 will be described as part of the functionality of the album creation application stored in the HDD 104, but may be provided as a separate application from the album creation application. Also, the image processing apparatus in which the album editing application is launched may be the same apparatus as the image processing apparatus 100 which generated the album data or another image processing apparatus.

As illustrated in FIG. 14, the album editing application 1400 includes an editing mode instruction component 1401, an album information reception component 1402, an album editing component 1403, an album display component 1404, and the album information holding component 215. Note that the album information holding component 215 does not have to be included in the album editing application 1400.

The editing mode instruction component 1401 causes the album editing application 1400 to shift to an editing mode in a case of, for example, detecting the user clicking an editing mode panel 1508 (see FIG. 15A) with an UI operation using the mouse 107. The editing mode refers to a mode in which operations to change album contents can be performed such as adding a double-page spread, cropping, replacing an image, changing the template, changing the size, changing the arrangement, inserting text and/or a stamp, and deleting a double-page spread. Here, an example of shifting to the editing mode in response to detecting a click on the editing mode panel has been described, but the album editing application 1400 may always shift to the editing mode after the generation of album data. Alternatively, the album editing application 1400 may shift to the editing mode in response to selecting any album.

In response to a shift to the editing mode by the editing mode instruction component 1401, the album information reception component 1402 receives album information from the album information holding component 215. The album information is, as mentioned earlier, information containing album configuration information, album generation information, and album change information. The album information reception component 1402 receives the album information on an album-by-album basis.

The album editing component 1403 uses the album information received by the album information reception component 1402 from the album information holding component 215 to edit an album(s) according to the user's UI operation using the mouse 107 or the keyboard 106. As mentioned earlier, the album information contains album configuration information and album generation information, and by using the album information, it is possible to obtain album data similar to the album data created by the album creation application. In the case where the album editing component 1403 updates an album(s), the album editing component 1403 outputs corresponding album information to the album information holding component 215 to update the album information. Also, the album editing component 1403 is capable of creating recommendations to be displayed to the user during album editing. Examples of the recommendations include a recommended image as a replacement in the double-page spread being edited by the user, a recommended double-page spread including a template or an arrangement, and the like. The album editing component 1403 is capable of creating various recommendations and outputting the created recommendations to the album display component 1404 in response to a shift to the editing mode by the editing mode instruction component 1401.

The album display component 1404 displays bitmap data output by the album editing component 1403 on the display 105. The album display component 1404 also displays an editing screen being edited by the album editing component 1403 on the display 105. The album display component 1404 also displays the recommendation(s) created by the album editing component 1403.

Note that album data obtained as a result of editing by the album editing application 1400 may be uploaded to the server via the Internet based on a user instruction. Based on the uploaded album data, printing and bookbinding processes are executed to thereby make albums in the form of booklets (photobooks), which will be delivered to designated users.

Figure 15A:
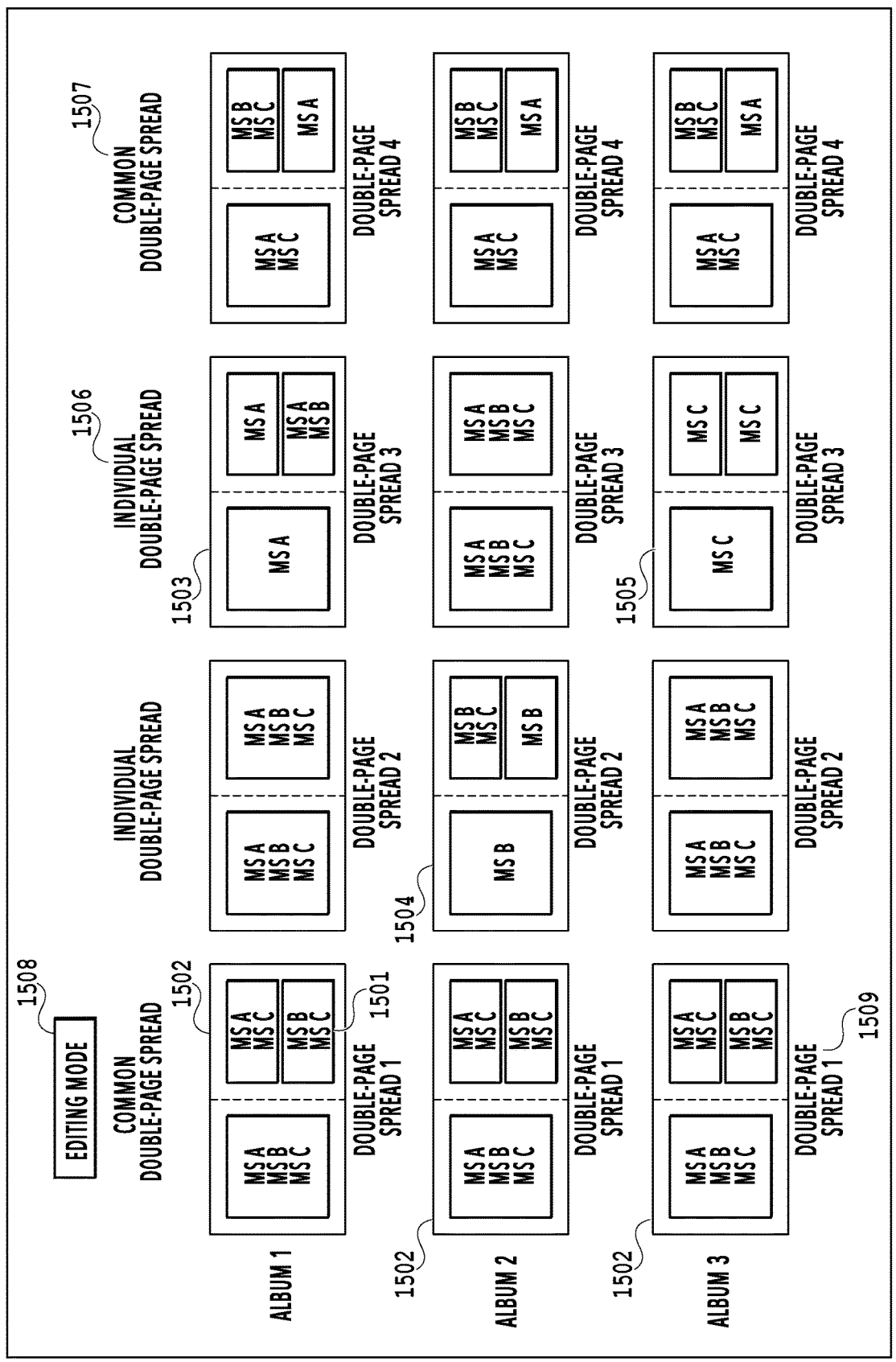
FIG. 15A is a diagram explaining an example of an album editing screen.

FIG. 15A and FIGS. 15B-1 and 15B-2 are diagrams illustrating UI display examples of album editing screens in the present embodiment. FIG. 15A is an example of a screen displayed on the display 105 after album generation. The album data in the present embodiment is data on three albums, namely, the album 1 for the person A as its album target (main subject), the album 2 for the person B as its album target, and the album 3 for a person C as its album target, as described above. An image 1501 is an example of an image placed in a double-page spread, and the characters in the image 1501 represent the main subjects appearing in the image. A common double-page spread 1502 represents an example in which images with a plurality of main subjects are mainly laid out. On the other hand, in individual double-page spreads 1503, 1504, and 1505, images with the main subjects A, B, and C are mainly laid out, respectively. As mentioned earlier, in the present embodiment, a plurality of albums are created each of which includes double-page spreads created based on a different criterion. The editing mode panel 1508 is a panel that enables a shift to the editing mode in response to being clicked with the mouse 107. Characters 1506 and 1507 are characters respectively representing an individual double-page spread and a common double-page spread on the display 105. In this example, characters are shown, but the common double-page spreads and the individual double-page spreads may be given different background colors.

Figures 1, 15B:
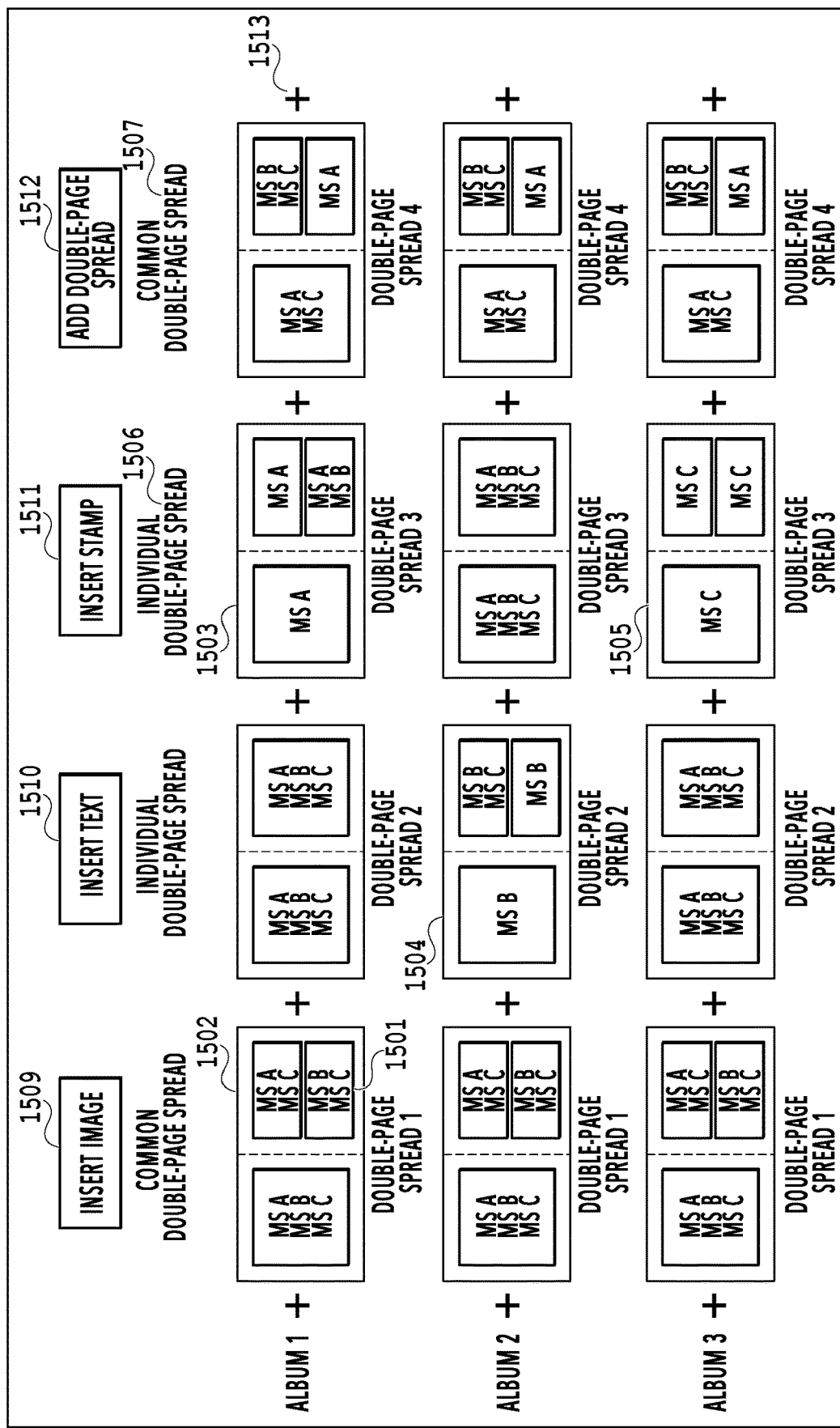

FIG. 15B-1 is a screen displayed on the display 105 by the album editing application 1400 after the editing mode panel 1508 is clicked with the mouse 107. Specifically, FIG. 15B-1 illustrates an example of an editing screen. In FIG. 15B-1, an album-based editing screen. Specifically, the double-page spreads in each album are displayed. Note that in a case where the albums or the double-page spreads cannot fit in the screen, the screen may be configured such that their entirety can be seen via display scroll or the like, or the display size of the double-page spreads may be changed to display the entire double-page spreads in the screen. In the present embodiment, depending on whether the editing-target double-page spread is a common double-page spread or an individual double-page spread, the processing varies. Details will be described later. Note that, in the example of the editing screen in FIG. 15B-1, "editing-target double-page spread" is each double-page spread in each album. Specifically, in the example of FIG. 15B-1, a total of 12 double-page spreads are "editing-target double-page spreads".

An image insertion panel 1509 is a panel to be clicked with the mouse 107 to shift to an image insertion state. In one example, in order to determine the image(s) to be inserted, all images obtained by the image obtaining component in the album creation may be displayed as selectable images. Instead of all images, the images not used in the albums may be displayed. A text insertion panel 1510 is a panel to be clicked with the mouse 107 to shift a text insertion state. For example, the mouse cursor may be changed to a text insertion cursor in response to a click on the text insertion panel 1510 with the mouse 107, and insertion of text may be enabled in response to a click within an album with the mouse 107. In this state, the text size, the font, and the text color may be settable. A stamp insertion panel 1511 is a panel to be clicked with the mouse 107 to shift to a stamp insertion state. For example, stamps may be displayed in response to a click on the stamp insertion panel with the mouse 107, and the user may be allowed to select any stamp from among these stamps and add it in an album. A double-page spread addition panel 1512 is a panel to be clicked with the mouse 107 to display a double-page spread addition UI. Each plus mark 1513 is an icon to be clicked with the mouse 107 to add a double-page spread. The position to additionally insert a double-page spread is fixed at the position of the plus mark.

Figures 2, 15B:
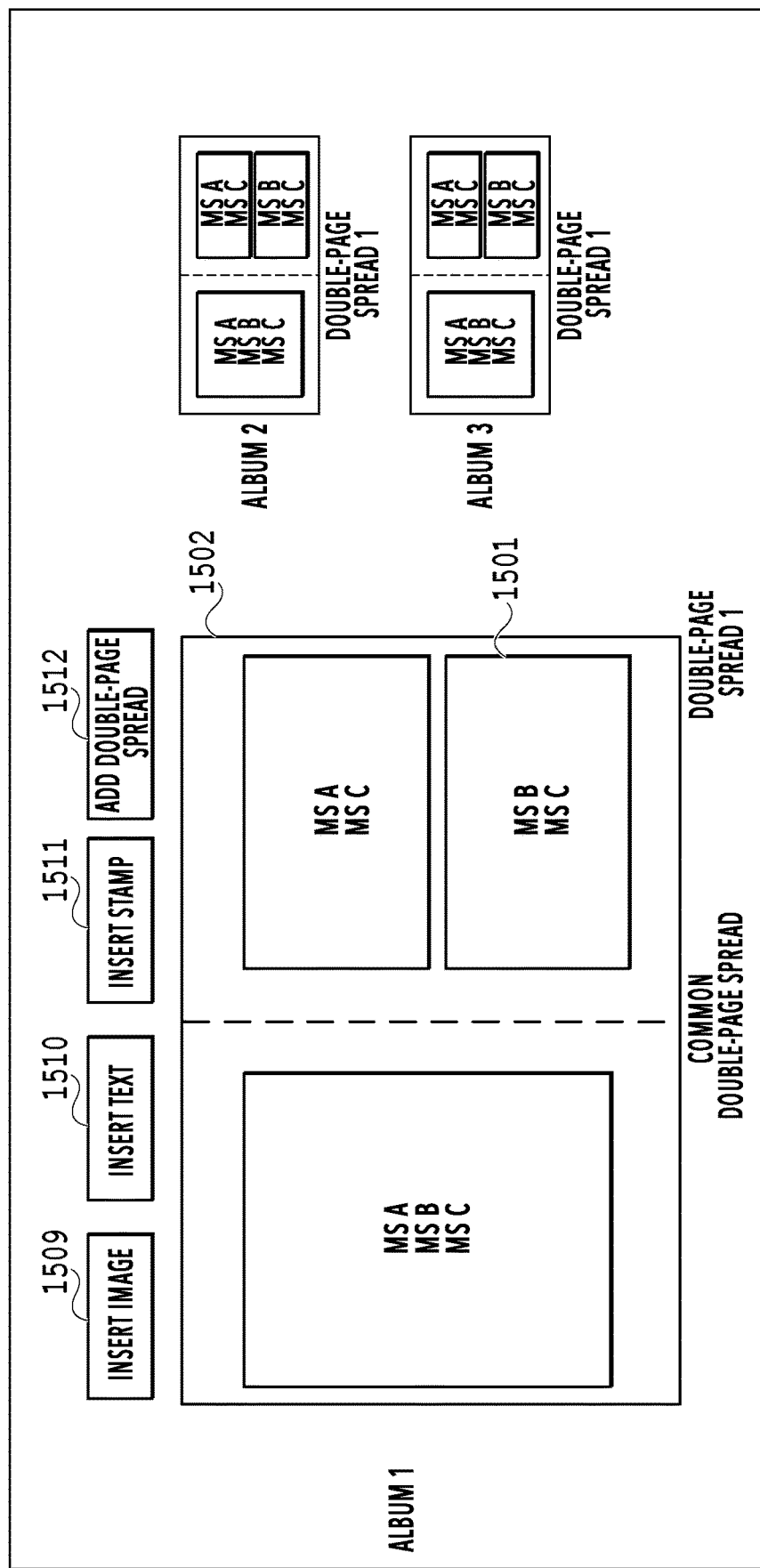

FIG. 15B-2 represents the editing mode focusing on a double-page spread in a desired album. FIG. 15B-2 illustrates an example focusing on a double-page spread 1 in the album 1 in FIG. 15B-1. FIG. 15B-2 is an editing screen for performing editing on a double-page spread basis. In the editing screen in FIG. 15B-2, "editing-target double-page spread" is the double-page spread focused on. That is, in the example of FIG. 15B-2, "editing-target double-page spread" is the double-page spread 1 in the album 1. To enable a double-page spread-based editing mode as illustrated in FIG. 15B-2, for example, any of the double-page spreads in FIG. 15B-2 may be clicked with the mouse 107 to shift a double-page spread-based editing mode focusing on that double-page spread. Note that clicking the small double-page spread 1 in the album 2 displayed in FIG. 15B-2 displays an editing screen focusing on the clicked double-page spread 1 in the album 2.

Note that the example described so far assumes that the various panels are to be left-clicked with the mouse 107, but a desired editing state may be reached by, for example, displaying a menu with a right-click of the mouse 107 and then left-clicking the menu with the mouse 107.

Also, the editing mode instruction component 1401 sets the timing at which to apply an editing result. The application of an editing result is a process of performing editing performed on one album also on another album(s) based on the information on the change made as a result of the editing. The timing at which to apply an editing result may be a case where the user performs an editing operation, a case where the user stores an album, a case where the editing-target double-page spread is changed, or a case where the editing-target album is changed. Also, the timing may be designated based on a user setting, or the software may determine the timing in advance and this timing may be used. In a case where any of such various timing conditions is satisfied, the album editing component 1403 performs the process of applying the editing result. The present embodiment assumes that the timing at which to apply an editing result is a case where the user performs an editing operation. The above is the general description of the album editing process.

Figure 16:
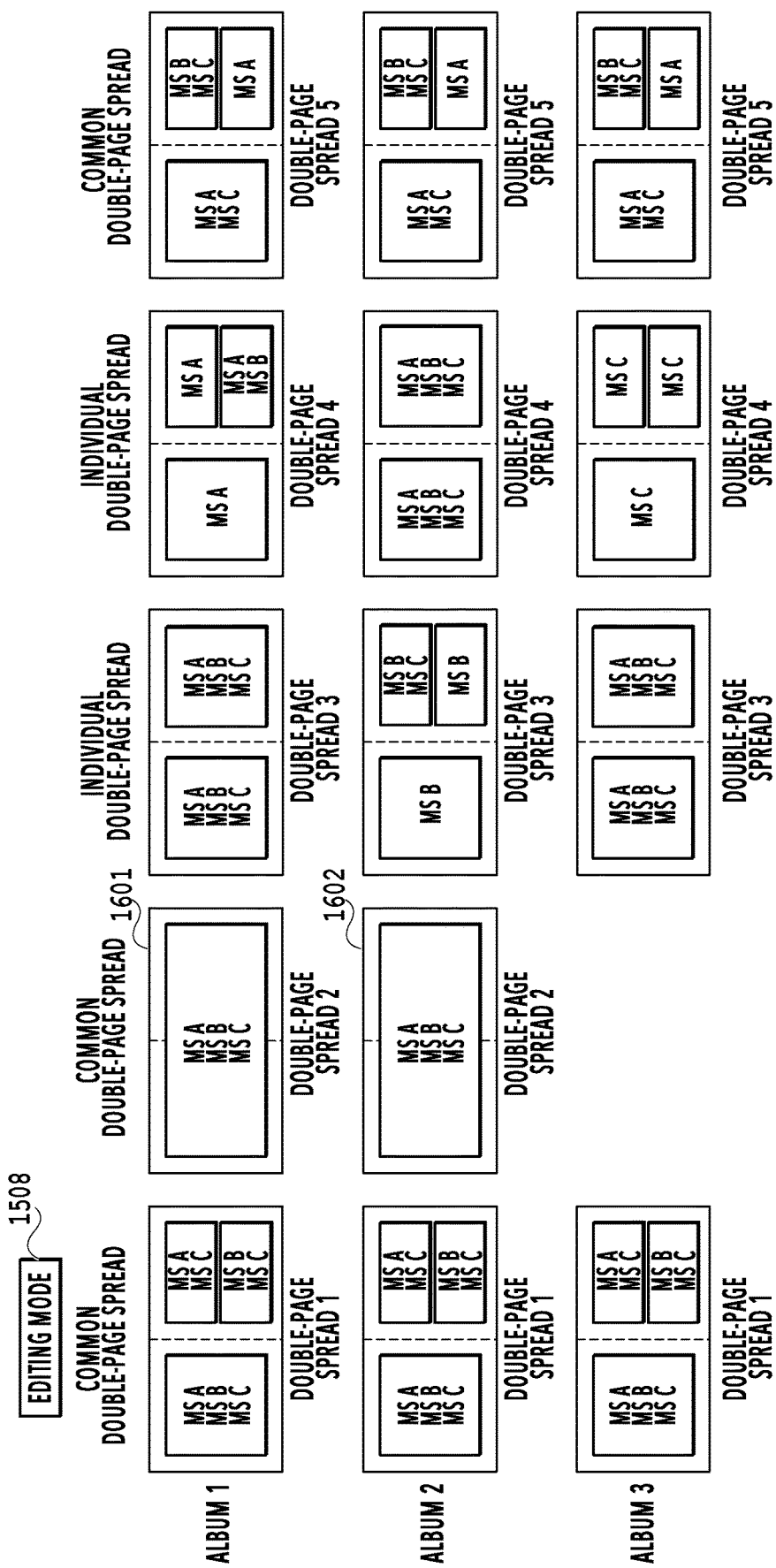
FIG. 16 is a diagram illustrating an example of adding a double-page spread.

FIG. 16 is a diagram illustrating an example of adding a double-page spread. FIG. 16 illustrates an example where a result of adding a double-page spread to the album 1 in the album configuration illustrated in FIG. 15A and adding an edit-applying double-page spread corresponding to this editing operation, or the addition of the double-page spread, to the album 2 is displayed on the display 105. Note that the edit-applying double-page spread is not added to the album 3 in this example.

FIG. 16 illustrates an example of adding a common double-page spread. Specifically, a common double-page spread is added to the album 1. The added common double-page spread is added to the double-page spread position of a double-page spread 2, so that the identification numbers of the subsequent double-page spreads are incremented.

Also, the same common double-page spread is added also to the album 2 as the double-page spread 2 in the album in a similar way to the album 1. This makes the number of double-page spreads equal in the albums 1 and 2 and thus eliminates inequality. In this example, since an added double-page spread 1601 is a common double-page spread, a double-page spread with the same layout is added to the album 2 as an edit-applying double-page spread 1602. Note that the added double-page spread 1601 and the edit-applying double-page spread 1602 are identical double-page spreads with no difference at all or similar double-page spreads.

Also, since the contents of the editing of the album 1 have not been applied to the album 3, the album 3 has one less double-page spread than the albums 1 and 2.

Figure 17:
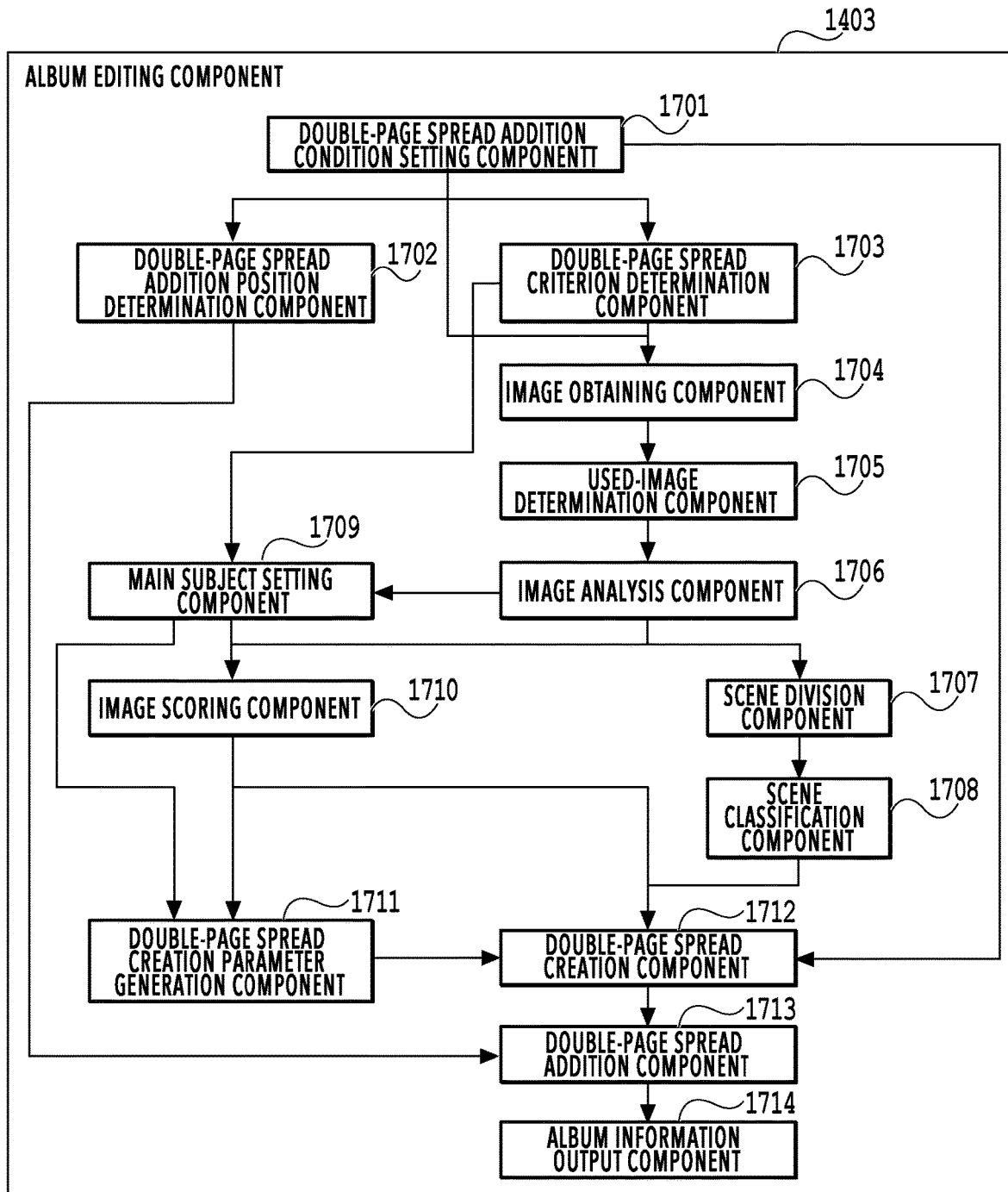
FIG. 17 is a block diagram illustrating details of an album editing component.

FIG. 17 is a block diagram illustrating details of the album editing component 1403. While the album editing component 1403 can include various functions, its blocks related to the double-page spread addition function will be mainly described in the present embodiment. The album editing component 1403 has a double-page spread addition condition setting component 1701, a double-page spread addition position determination component 1702, a double-page spread criterion determination component 1703, an image obtaining component 1704, a used-image determination component 1705, an image analysis component 1706, a scene division component 1707, and a scene classification component 1708. The album editing component 1403 also has a main subject setting component 1709, an image scoring component 1710, a double-page spread creation parameter generation component 1711, a double-page spread creation component 1712, a double-page spread addition component 1713, and an album information output component 1714.

The double-page spread addition condition setting component 1701 sets conditions for initiating a double-page spread addition process. This double-page spread addition process refers to a process of automatically adding a double-page spread(s) by the album editing application 1400. Note that, in the present embodiment, this double-page spread addition process includes therein a process of applying the result of editing using an added double-page spread also to another album(s), i.e., a process of adding a double-page spread to another album(s). As for the setting of the double-page spread addition conditions, the double-page spread addition conditions are designated by the user's UI operation using the mouse 107 or the keyboard 106, and are set in response to an execution instruction. The double-page spread addition conditions include an image group to be used for the albums, the number of double-page spreads to be added, and the double-page spread addition target album.

Note that the number of double-page spreads to be added may be designated by the user, or a certain number of double-page spreads may always be added. Also, the number of double-page spreads to be added may be determined based on the number of images that are not actually used in the image group to be used for the albums. Also, the image scores of the images not used in the albums may be used. Specifically, an image score threshold value may be set. Then, the number of images whose image score is greater than or equal to the image score threshold value may be calculated, and the number of double-page spreads to be added to each album may be determined. A quotient obtained by dividing the number of images whose image score is greater than or equal to the image score threshold value by a fixed value may be used as the number of double-page spreads to be added.

In another example, a threshold value for the double-page spread score may be determined and used. The double-page spread score is the sum of the scores of the images included in a double-page spread each multiplied by a predetermined weight. The weight here uses, for example, information on time within the double-page spread and information on the size and arrangement of the slot in the double-page spread including the image. A score multiplied by a weight corresponding to the size of the slot where the image is placed may be used. This is because an image placed in a larger slot is a more important image in the double-page spread, and such an imagery element should be enhanced. The sum of the scores of the images in a double-page spread each multiplied by a predetermined weight as described above serves as the score of the double-page spread. In one example, images whose image score is greater than or equal to a threshold value may be used to create double-page spreads, and double-page spreads whose double-page spread score is greater than or equal to a double-page spread score threshold value may be created as many as possible and added. In another example, the maximum number of double-page spreads up to which the album price does not increase may be added.

The user may designate the double-page spread addition target album, or a double-page spread(s) may be added to the currently edited album. Note that the addition-target album set by the double-page spread addition conditions can be expressed as a primary addition-target album. In a case where a double-page spread(s) is(are) added to this primary addition-target album, the same number of double-page spreads added to the primary addition-target album are added to another album(s) (also referred to as "secondary addition-target album") as well.

Figure 18:
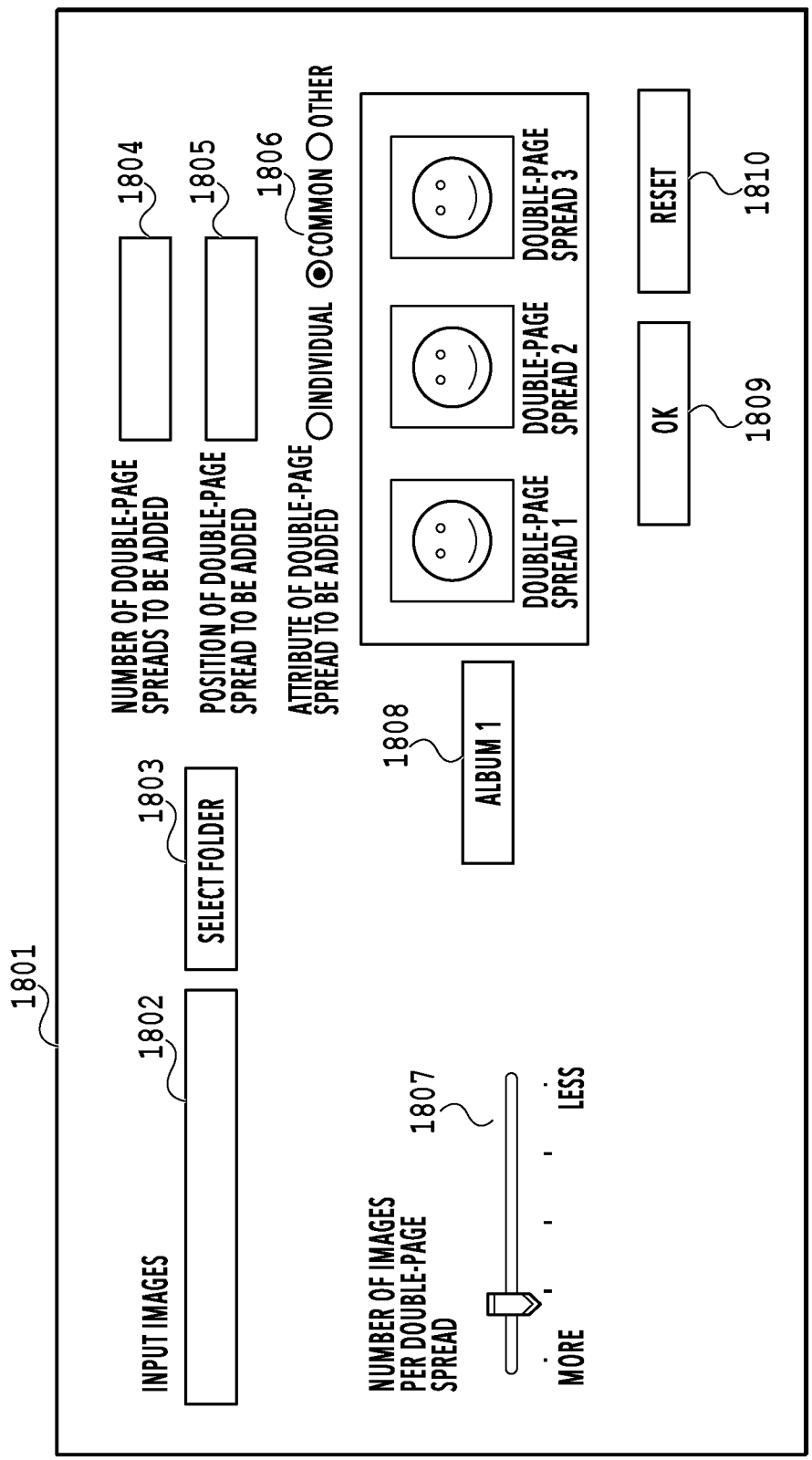
FIG. 18 is a diagram illustrating a double-page spread addition UI.

FIG. 18 represents a display screen 1801 provided by the album creation application for addition of a double-page spread(s) and is displayed on the display 105. Via the display screen 1801, the user can designate conditions for creating the double-page spread(s) to be added. The display screen 1801 is a double-page spread addition UI displayed in response to a click on the double-page spread addition panel 1512 in FIG. 15B-1, for example.

A path box 1802 is a box for indicating the storage location (path), in the HDD 104, of an image group to be used to create the double-page spread(s) to be added. That storage location may be the same as or different from the storage location used in the album creation.

A folder selection button 1803 is a button for selecting the folder containing the image group to be used to create the double-page spread(s) to be added. In response to the user clicking the folder selection button 1803 with the mouse 107, a tree including a plurality of folders is displayed. Then, in response to the user selecting the folder containing the image group to be used to create the double-page spread(s) to be added, a folder path to the selected folder is displayed in the path box 1802.

A to-be-added double-page spread number box 1804 is a box for designating the number of double-page spreads to be added to each album. The user can directly enter a number into the double-page spread number box 1804 with the keyboard 106 or enter a number into the double-page spread number box 1804 from a list with the mouse 107. In the present embodiment, an example of adding one double-page spread per album will be exemplarily described. An example where the user designates the number of double-page spreads to be added via the above double-page spread addition UI has been described, but the number of double-page spreads to be added may be determined automatically, as mentioned earlier. Also, the number of double-page spreads to be added may be determined automatically in a case where no number is entered in the double-page spread number box 1804.

A to-be-added double-page spread position box 1805 is a box for designating a double-page spread identification number as the position of a double-page spread to be added in a case of adding this double-page spread to an album. The user can directly enter a number into the to-be-added double-page spread position box 1805 with the keyboard 106 or enter a number into the to-be-added double-page spread position box 1805 from a list with the mouse 107. Note that in a case where one of the plus marks 1513 in FIG. 15B-1 is clicked and then the double-page spread addition panel 1512 is clicked, the position of that plus mark 1513 may be set as the position to add a double-page spread.

Each to-be-added double-page spread attribute checkbox 1806 is a box for designating the attribute of the double-page spread(s) to be added. The user can select one of the checkboxes by using the keyboard 106 or the mouse 107. A double-page spread(s) of the selected attribute will be automatically generated. Also, the attribute may be determined automatically in a case where no checkbox is checked. Moreover, a checkbox for automatic determination may be added.

A double-page spread image number setting part 1807 is a slider bar for setting the number of images to be placed in the to-be-added double-page spread(s) to be created. Moving the slider to "MORE" side increases the number of images to be placed in each double-page spread. On the other hand, moving the slider to "LESS" side decreases the number of images to be placed in each double-page spread.

An album selection button 1808 is a button for selecting the album into which to insert the double-page spread(s) to be added. In response to the user clicking the album selection button 1808 with the mouse 107, a list of currently created albums are displayed. Then, in response to the user designating one or more albums from the list, the designated albums are selected as the albums into which to insert the double-page spread(s) to be added. Note that the currently edited album may be automatically determined as the album into which to insert the double-page spread(s) to be added, as mentioned earlier. Alternatively, the addition UI may be configured such that the currently edited album is selected by default. Here, in the present embodiment, a double-page spread will be added to an album(s) other than the album(s) selected with the album selection button 1808. Note that the double-page spread is not necessarily added to all albums.

An OK button 1809 is a button for determining selected conditions as the to-be-added double-page spread creation conditions. In response to the user clicking the OK button 1809 with the mouse 107, the to-be-added double-page spread creation conditions are fixed and transferred to components in the album editing component 1403 via the double-page spread addition condition setting component 1701. A reset button 1810 is a button for resetting the setting information in the display screen.

The description now returns to FIG. 17. The double-page spread addition position determination component 1702 determines the insertion position of the double-page spread to be added in each album. In a case where the position of the double-page spread to be added has been designated by the double-page spread addition condition setting component 1701, the double-page spread addition position determination component 1702 can set that position as the double-page spread addition position. Alternatively, the double-page spread addition position determination component 1702 may automatically determine the double-page spread addition position. In one example of automatically determining the double-page spread addition position, the double-page spread position may be added after the double-page spread currently edited by the user. In another example, the position may always be added after the last double-page spread. In a case where the double-page spreads in the album are positionally separated into a common double-page spread group and an individual double-page spread group, the double-page spread to be added may be inserted as the last double-page spread in the common double-page spread group or the individual double-page spread group according to a double-page spread criterion designated as a double-page spread addition condition. Still alternatively, the layout of the double-page spread to be added may be created first, and then its position may be determined such that it matches the time order of the layout or such that the whole album's score is highest. The whole album's score may be, for example, derived based on the arrangement of the double-page spreads following the joining rule of the double-page spread joining component 211 (e.g., time order, etc.) or the like.

In still another example of automatically determining the addition position of a double-page spread after creating the double-page spread, information on the time order of the created double-page spread and information on the double-page spread criterion may be used to determine a position in the album where the criterion and the time order match as the double-page spread addition position. In the case of an album in which its double-page spreads are positionally separated into a common double-page spread group and an individual double-page spread group, to which group the double-page spread to be added belongs may be determined based preferentially on the double-page spread criterion, and a position matching in terms of time order may be determined as the position of the double-page spread to be added. In a case of an album in which the positions of its double-page spreads are not separated into a common double-page spread group and an individual double-page spread group, a position matching in terms of time order may be determined as the position of the double-page spread to be added. Note that a recommended double-page spread addition position may be determined and displayed to the user.

The double-page spread criterion determination component 1703 determines a double-page spread creation criterion for the double-page spread to be added. Specifically, the double-page spread criterion determination component 1703 determines which criterion to use among "common double-page spread", "individual double-page spread", and "other double-page spreads". "Other double-page spreads" refer to a double-page spread creation criterion that is neither "common" nor "individual" and was not used in the automatic album creation, and may be, for example, a criterion using only the scores of images without determining the main subject or a criterion obtained by weighting and summing the common double-page spread criterion and the individual double-page spread criterion.

In a case where the criterion of the double-page spread to be added has been set by the double-page spread addition condition setting component 1701, the double-page spread criterion determination component 1703 determines the double-page spread criterion based on that setting. In a case where the criterion of the double-page spread to be added has not been set, "other" has been set, or another similar case, the double-page spread criterion determination component 1703 may automatically determine the double-page spread criterion. In an example of automatically determining the double-page spread criterion, a determination corresponding to the position of the double-page spread to be added may be made. For example, the double-page spread criterion used for the double-page spreads on both sides of the double-page spread to be added may be used. In a case where different double-page spread criteria are used for the double-page spreads on both sides, the number of images suitable for a common double-page spread among the images not used for the albums and the number of images suitable for an individual double-page spread among the images not used for the albums are compared, and the criterion with the larger number of images may be used. Note that the images suitable for a common double-page spread and the images suitable for an individual double-page spread each refer to an image of a criterion with a higher score found by a comparison between a score for one double-page spread criterion and a score for the other. For the comparison between the scores, a threshold value may be set, and in a case where the difference between the score for a common double-page spread and the score for an individual double-page spread is greater than or equal to the threshold value, the image may be determined to be suitable for the criterion with the higher score. In a case where an image is newly added in the editing and its image score has not yet been calculated, the image score may be calculated at this point.

In another example of automatically determining the double-page spread criterion, the double-page spread criterion of the double-page spread to be added may be determined based on the balance between the number of common double-page spreads and the number of individual double-page spreads in the album. In one example of determining the criterion using the balance between the number of common double-page spreads and the number of individual double-page spreads in the album, the criterion is determined such that the ratio between the number of common double-page spreads and the number of individual double-page spreads gets closer to 5:5. Also, in a case where the user issues an instruction to add a double-page spread after selecting images which the user wishes to use for the double-page spread, a double-page spread criterion suitable for those selected images may be determined. Alternatively, a double-page spread may be automatically created for each of the plurality of creation criteria, and the criterion with the highest double-page spread score may be employed as the double-page spread criterion. The double-page spread criterion may be determined by using one of the above examples or by using a combination of two or more of the examples. Double-page spreads automatically generated for the plurality of creation criteria may be displayed on the display 105, and the criterion of a double-page spread selected by the user may be determined as the double-page spread criterion.

The image obtaining component 1704 obtains the image group set by the double-page spread addition condition setting component 1701. The image obtaining component 1704 is a processing component similar to the image obtaining component 203 of the album creation application. Note that in a case where the user has not designated any image group or the user has designated the same image group as that in the album creation and the data obtained by the image obtaining component 203 in the album creation is still held, the obtaining of the images may be skipped and the images that have been obtained may be used as they are. In a case where the storage location of the image group set by the double-page spread addition condition setting component 1701 is different from the folder obtained by the image obtaining component 203 in the album creation or the HDD 104 has been updated and the number of images has changed, a preset image group is obtained from the HDD 104.

Based on the image use information contained in the album information received by the album information reception component 1402, the used-image determination component 1705 determines, for each image obtained by the image obtaining component 1704, whether the image is an image used in an album. Note that whether the image is a used image may be varied depending on the determination by the double-page spread criterion determination component 1703. For example, in a case where the double-page spread criterion determination component 1703 has determined that the double-page spread criterion is the individual criterion, the used-image determination component 1705 may determine whether the image is a used image by using the image use information on the editing-target album. On the other hand, in a case where the double-page spread criterion determination component 1703 has determined that the double-page spread criterion is the common criterion, the used-image determination component 1705 may determine whether the image is a used image by using the image use information on all albums. In a case where an image determined as a used image is placed in an album, image duplication will occur in one or more albums, and the used image is therefore not used in the creation of the double-page spread to be added. In one example of a method to avoid using a used image in the creation of the double-page spread to be added, each piece of image data obtained may be discarded. Also, a used-image flag or used-image label may be used as an indication of a used image to skip a process to be described later or not to select such an image as an image for creating the double-page spread. In the present embodiment, a process of attaching the used-image flag to each used image is performed to prevent it from being selected as a target image for the creation of the double-page spread to be added.

The image analysis component 1706 performs an analysis process on the pieces of image data obtained by the image obtaining component 1704. The image analysis component 1706 is a processing component similar to the image analysis component 204. In a case where there is an image obtained by the image obtaining component 1704 that is the same as one used in the album creation, the analysis result obtained in the album creation may be used.

The scene division component 1707 divides the image group obtained by the image obtaining component 1704 into scenes based on the analysis information obtained by the image analysis component 1706. The scene division component 1707 is a processing component similar to the scene division component 206. Note that in a case where there are images obtained by the image obtaining component 203 that are the same as ones used in the album creation, the division result obtained in the album creation may be used.

The scene classification component 1708 determines the category of the image group in each scene obtained by the scene division component 1707. The scene classification component 1708 is a processing component similar to the scene classification component 207. In the case of using the same image as one in the album creation, the classification result obtained in the album creation may be used.

The main subject setting component 1709 sets the main subject to be emphasized for each album. The main subject setting component 1709 is a processing component similar to the main subject setting component 205. The main subject setting component 1709 sets a main subject corresponding the double-page spread criterion determined by the double-page spread criterion determination component 1703. Note that an absence of a main subject may be used as a setting.

Based on the analysis information obtained by the image analysis component 1706, the image scoring component 1710 scores each image for each main subject set by the main subject setting component 1709. The image scoring component 1710 is a processing component similar to the image scoring component 208. In a case of the same image and subject as those in the album creation, the scoring does not have to be performed again, and the scores calculated in the album creation may be used.

The double-page spread creation parameter generation component 1711 generates a parameter for creating a double-page spread based on the main subjects set by the main subject setting component 1709 and the analysis information obtained by the image analysis component 1706. The double-page spread creation parameter generation component 1711 is a processing component similar to the double-page spread creation parameter generation component 209. The double-page spread creation parameter generation component 1711 sets a parameter for creating a double-page spread which corresponds to the double-page spread criterion determined by the double-page spread criterion determination component 1703. Examples of this double-page spread creation parameter include a weight to be applied to the scores obtained by the image scoring component 1710. Examples of information used to calculate the weight include the various types of information described with respect to the double-page spread creation parameter generation component 209. Also, the weight may be determined as the double-page spread creation parameter by using used image information, information on time within the double-page spread including images, and information on the sizes and arrangements of the slots in the double-page spread including images. For example, as described with respect to the double-page spread creation parameter generation component 209, in the placement of an image into a slot, the weight may be varied according to whether the image is an image placed after cropping or an image placed without cropping and whether the double-page spread using that image is a common double-page spread or an individual double-page spread. Also, the scores of a user-used image additionally inserted by the user may be weighted to adjust the scores of the user-used image to high scores. Also, for each used image already used in an album, the weight may be set low to prevent the used image from being selected, in order to avoid employing duplicate images.

Also, the double-page spread creation parameter includes a parameter for deriving the double-page spread score (second parameter). In the example of FIG. 15B-2, it is the sum of the scores of the images in the double-page spread 1 in the album 1 each multiplied by a weight corresponding to the size of the slot where the image is placed. This is because an image placed in a larger slot is a more important image in the double-page spread, and such an imagery element should be enhanced. Note that while an example of summing the scores of the images multiplied by the weights corresponding to their respective slot sizes has been described above, the weighting may be omitted or an average of the images may be used as the score of the double-page spread.

The double-page spread creation component 1712 creates a double-page spread by using the result of the scoring by the image scoring component 1710, the used image information determined by the used-image determination component 1705, and the double-page spread creation parameter generated by the double-page spread creation parameter generation component 1711. The double-page spread creation component 1712 selects images with high final scores as the images to be used in the double-page spread and places them to create the double-page spread. The double-page spread creation component 1712 is a processing component similar to the double-page spread creation component 210. The double-page spread creation component 1712 creates the number of double-page spreads set by the double-page spread addition condition setting component 1701. Also, in the present embodiment, in response to the creation of the double-page spread to be added to the double-page spread addition-target album set as a double-page spread addition condition, the double-page spread creation component 1712 performs a process of creating a double-page spread to be added on another album(s) as well.

The double-page spread addition component 1713 adds each double-page spread to be added created by the double-page spread creation component 1712 to the corresponding album according to the result of the determination by the double-page spread addition position determination component 1702, and determines the double-page spread identification number of the double-page spread in the album to create the entire layout of the album.

In a case where the albums are updated, the album information output component 1714 outputs album information based on the editing result to the album information holding component 215.

Note that, in the present embodiment, the album editing process has been described based mainly on an example of automatically adding a double-page spread, the album editing process may be performed according to a user operation. As mentioned earlier, even in a case of, for example, performing cropping, replacing an image(s), changing the template, changing the size, changing the arrangement, inserting text and/or a stamp(s), or deleting a double-page spread(s), the album editing component 1403 can perform album editing based on a user input.

Figure 19:
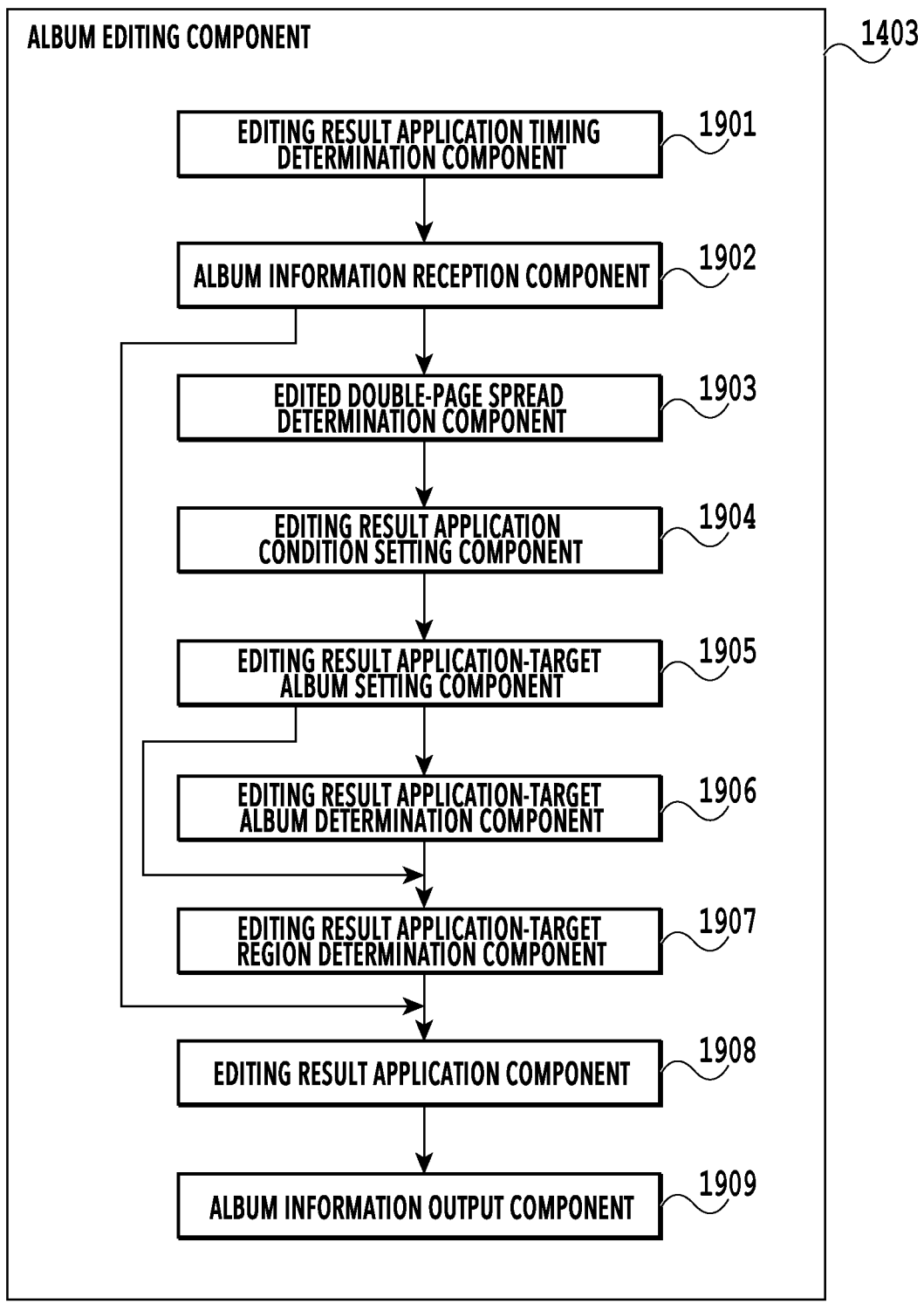
FIG. 19 is a software block diagram of an album editing application.

FIG. 19 is a software block diagram illustrating a module group related to the applying of an editing result as modules included in the album editing application 1400 in the present embodiment.

An editing result application timing determination component 1901 determines whether any of the editing result application timing conditions designated by the editing mode instruction component 1401 is satisfied, i.e., whether a timing to apply the result of editing performed on one album to another album(s) has come.

An album information reception component 1902 is a processing component similar to the album information reception component 1402, and receives album information from the album information holding component 215 on an album-by-album basis. This album information is, in particular, album configuration information, album generation information, and album change information. The album change information contains information on the change made as a result of editing. The information on the change made as a result of editing may be difference information changed as a result of album editing or a user operation history on the album editing.

An edited double-page spread determination component 1903 determines whether an edited double-page spread is a common double-page spread by using the album change information contained in the album information received by the album information reception component 1902. Note that in this example, whether an edited double-page spread is a common double-page spread is determined based on whether the criterion used in the automatic generation of the double-page spread is the common criterion. However, the method of determining whether an edited double-page spread is a common double-page spread is not limited to this one. For example, in a case where the same double-page spread is used in a plurality of albums, this same double-page spread may be determined as a common double-page spread, a flag may be used to manage common double-page spreads, and a double-page spread given a fixed double-page spread identification number may be determined as a common double-page spread.

An editing result application condition setting component 1904 sets conditions for applying the result of editing of a double-page spread determined as a common double-page spread by the edited double-page spread determination component 1903 to another album(s). Specifically, layout information such as the background color or the template may be used as a condition, an editing content such as insertion of text or insertion of a stamp may be used as a condition, and a position such as the double-page spread identification number or a certain region in the album may be used as a condition. In another example, no application condition may be set, and every editing result may always be applied. In the present embodiment, editing result application is performed for editing other than insertion of text and insertion of a stamp.

An editing result application-target album setting component 1905 sets to which album(s) to apply an editing result. In the present embodiment, the editing result application-target album setting component 1905 sets the target album(s) such that the editing result will not be applied to at least one album. As for the method of determining the album(s) to which to apply the result of editing of a predetermined album, for example, the user may sort the albums into groups in advance and the editing result may be applied to a certain group(s), or the editing result may be applied to each album whose score of the double-page spread will be high in a case of applying the contents of the editing result to the album. Alternatively, for image editing, the application-target album(s) may be set based on an image score. In one example of setting the application-target album(s) based on an image score, an image score using the main subject of the individual double-page spread(s) is used to evaluate the editing contents, and the editing contents are applied to each album with a high score. In this way, in the present embodiment, the editing contents are applied to an album with a high score whereas the editing contents are not applied to an album whose score of the double-page spread will be low in a case of applying the contents of the editing result to the album. Also, in a case where applying the contents of the editing result makes the score of the double-page spread high in all albums, the contents are not applied to the album whose score increases to the least extent. This makes it possible to apply appropriate editing contents to each individual target user associated with an album.

An editing result application-target album determination component 1906 determines, for each album, whether to apply the editing result to the album based on the setting made by the editing result application-target album setting component 1905 about whether the album is an editing result application target. The processes by the following processing components are not performed on an album determined to be not an editing-result application target by the editing result application-target album determination component.

An editing result application-target region determination component 1907 determines whether a target region satisfies any of the conditions set by the editing result application condition setting component 1904. In the present embodiment, the result of the determination by the editing result application-target region determination component 1907 is used to manage a region(s) satisfying any of the editing result application conditions and a region(s) satisfying none of the editing result application conditions. In one example of a method of managing the determination result, for each double-page spread region, a flag indicating whether it is a region to which to apply an editing result may be used to manage whether to apply a result. Alternatively, only a user operation history on editing satisfying any of the editing result application conditions may be transferred to an editing result application component 1908.

The editing result application component 1908 applies editing performed on a double-page spread determined to be a common double-page spread by the edited double-page spread determination component 1903 to another album(s) by using the result of the determination by the editing result application-target region determination component 1907 and the information on the change made as a result of the editing received by the album information reception component 1902. Note that the edit application process in this example is to apply the contents of editing performed on one album also to another album(s) as they are, specifically, to add the same double-page spread as that added to the one album also to the other album(s). In one conceivable method of creating the same double-page spread, the album generation information is used to create the automatically generated album, and then the same operation as that described in the album change information is performed. By this method, the same double-page spread with a completely matching layout and arrangement can be created. Alternatively, the album configuration information received by the album information reception component may be used to create the same double-page spread with a completely matching layout and arrangement. By the process of the editing result application component 1908, the layout of a common double-page spread can be the same between the edited album and some of the albums other than the edited album.

In a case where the albums are updated, an album information output component 1909 outputs album information based on the editing result to the album information holding component 215. This album information is, in particular, album configuration information, album generation information, and album change information.

In the present embodiment, with the above-described configuration, editing performed on a predetermined album, specifically, a change in a common double-page spread, is applied to an album(s) other than the predetermined album but is not applied to at least one album. In this way, the layout of each album can be adjusted individually.

Figure 20:
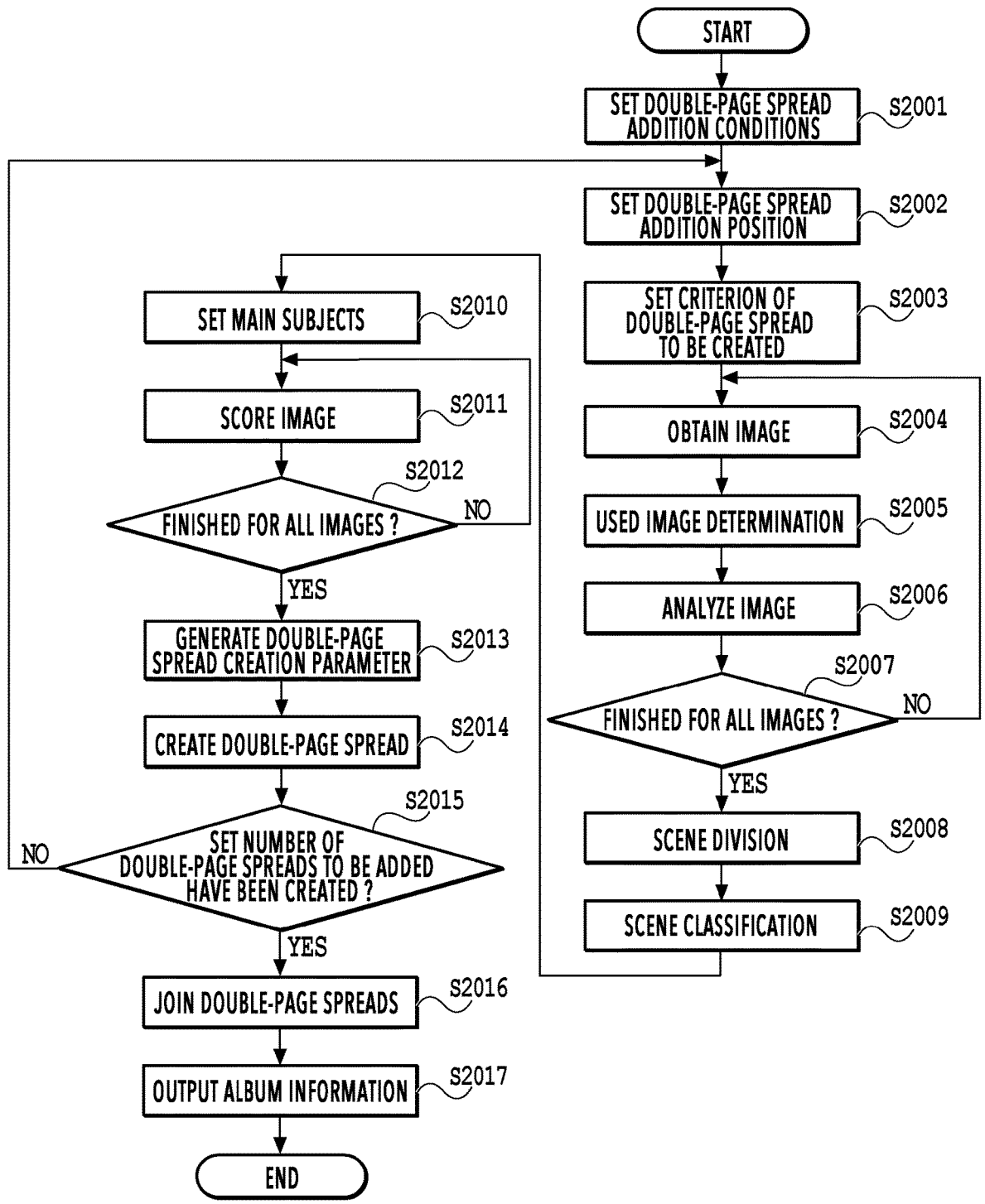
FIG. 20 is a flow diagram of a process of executing double-page spread addition.

FIG. 20 is a flowchart illustrating a process of executing double-page spread addition by the album editing application 1400 according to the present embodiment. The CPU 101 implements the flowchart illustrated in FIG. 20 by reading out a program stored in the HDD 104 into the ROM 102 or the RAM 103 and executing it, for example.

In S2001, the double-page spread addition condition setting component 1701 sets the double-page spread addition conditions. In the present embodiment, an image group to be used for the albums, the number of double-page spreads to be added, and the album to be subjected to the double-page spread addition are set as the double-page spread addition conditions. Here, the user sets the double-page spread addition-target album to be subjected to the double-page spread addition. In the process of the present embodiment, double-page spread addition will be performed also on an album(s) not set as the double-page spread addition target in this step.

In S2002, the double-page spread addition position determination component 1702 determines the double-page spread addition position. In S2003, the double-page spread criterion determination component 1703 determines which criterion to use for the double-page spread to be added. Specifically, the double-page spread criterion determination component 1703 determines which double-page spread criterion to use among "common double-page spread", "individual double-page spread", and "other double-page spreads", as mentioned earlier.

In S2004, the image obtaining component 1704 reads an image included in the image group set by the double-page spread addition condition setting component 1701 from the HDD 104 and loads it into the RAM 103. In a case where the image has already been loaded in the RAM 103, this process is not performed.

In S2005, the used-image determination component 1705 determines whether the obtained image is a used image based on the album information (used image information) obtained by the album information reception component 1402 and the double-page spread criterion determined by the double-page spread criterion determination component 1703. In a case where the criterion of the double-page spread to be added is "common", the used image information on all albums is used. In a case where the criterion of the double-page spread to be added is "individual" or "other", the used image information on the currently edited album is used. In the following, the flowchart will be described by taking as an example a case where the criterion of the double-page spread to be added is "common".

In S2006, the image analysis component 1706 analyzes the image data loaded in the RAM 103. The image analysis process involves a process flow similar to the process explained in FIG. 5B.

In S2007, the image analysis component 1706 determines whether the processes in S2005 and S2006 have been finished for all images in the image group in the HDD 104 designated by the double-page spread addition condition setting component 1701. In a case where the processes have not been finished, the flow returns to S2004. In a case where the processes have been finished, the flow proceeds to S2008.

In S2008, the scene division component 1707 executes scene division on the image group obtained by the image obtaining component 1704. S2008 is a similar process to S505. In S2009, the scene classification component 1708 executes scene classification on the sub image groups obtained by the division by the scene division component 1707. S2009 is a similar process to S506.

In S2010, the main subject setting component 1709 sets the main subject of each album. Based on the album information received by the album information reception component 1402, the addition-target album to be subjected to the double-page spread addition set in S2001, and the double-page spread criterion determined in S2003, the main subject setting component 1709 sets the main subject of the addition-target album. In this example, the double-page spread addition process is performed on the album 1. Also, in this example, the common double-page spread criterion is used. As a result, the main subjects A, B, and C are set for the album 1.

In S2011, the image scoring component 1710 scores an image. S2011 is a similar process to S508. In S2012, the image scoring component 1710 determines whether the image scoring in S2011 has been finished for all images. In a case where the image scoring has not been finished, the flow returns to S2011. In a case where the image scoring has been finished, the flow proceeds to S2013.

In S2013, the double-page spread creation parameter generation component 1711 generates the double-page spread creation parameter based on the double-page spread addition conditions set in S2001 and the main subjects of the addition-target album set in S2010. S2013 is a similar process to S510.

In S2014, the double-page spread creation component 1712 creates a double-page spread to be added to the addition-target album by using the double-page spread creation parameter generated in S2013. The double-page spread creation process is a similar process to S511.

In S2015, the album editing component 1403 determines whether the number of double-page spreads created in S2014 has reached the number of double-page spreads to be added set by the double-page spread addition condition setting component 1701. In a case where the number of double-page spreads to be added has not been reached, the flow returns to S2002. In a case where the number of double-page spreads to be added has been reached, the flow proceeds to S2016.

In S2016, the double-page spread addition component 1713 inserts the double-page spread(s) created by the double-page spread creation component 1712 at the determined double-page spread addition position(s) and performs album joining to create the entire layout of the album.

In S2017, the album information output component 1714 outputs album information.

Figure 21:
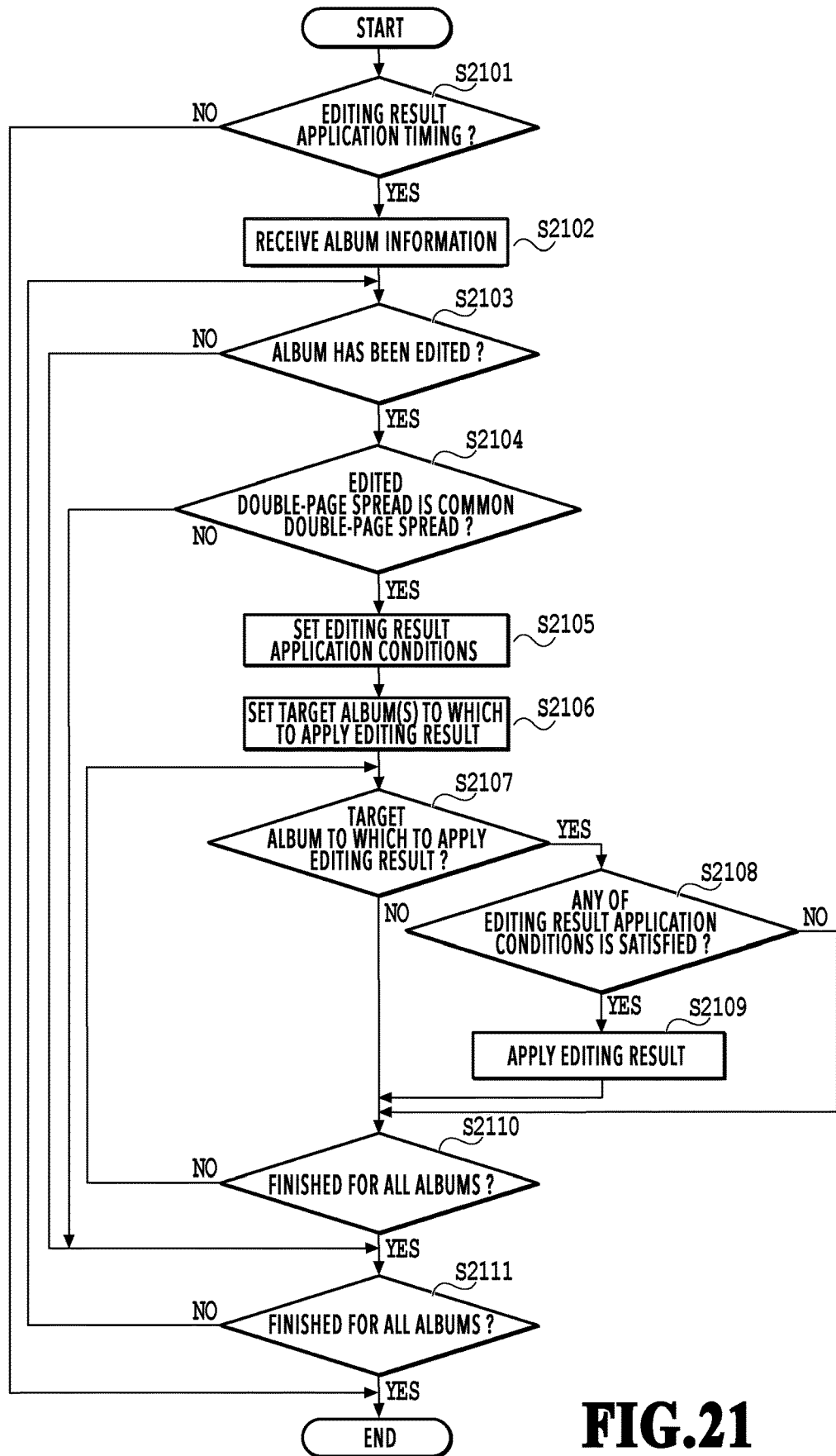
FIG. 21 is a flow diagram illustrating a process of applying the result of editing of a predetermined album to another album(s)

Subsequently, the editing result application process included in the automatic layout process by the album creation application according to the present embodiment will be described using FIG. 21. FIG. 21 is a flowchart illustrating the editing result application process by the album editing application 1400 according to the present embodiment. The CPU 101 implements the flowchart illustrated in FIG. 21 by reading out a program stored in the HDD 104 into the ROM 102 or the RAM 103 and executing it, for example.

In S2101, the editing result application timing determination component 1901 determines whether any of the editing result application timing conditions designated by the editing mode instruction component 1401 is satisfied. In a case where the editing result application timing has come, the flow proceeds to S2102. In a case where the editing result application timing has not yet come, the series of processes is terminated.

In S2102, the album information reception component 1902 receives album information containing information on the contents of the editing performed on the predetermined album from the album information holding component 215. The album information received in this step is loaded into and held in the RAM 103.

In S2103, the edited double-page spread determination component 1903 determines whether the determination-target album (hereinafter "first album of interest") is an edited album. In a case where the result of the determination in this step is positive, the flow proceeds to S2104. On the other hand, in a case where the result of the determination is negative, the flow proceeds to S2111.

In S2104, the edited double-page spread determination component 1903 determines whether the double-page spread edited in the edited album (hereinafter "edited double-page spread") is a common double-page spread. In a case where the result of the determination in this step is positive, the flow proceeds to S2105. On the other hand, in a case where the result of the determination is negative, the flow proceeds to S2111.

In S2105, the editing result application condition setting component 1904 sets the conditions for applying the editing result (hereinafter "editing result application conditions").

In S2106, the editing result application-target album setting component 1905 sets the target album(s) to which to apply the editing result.

In S2107, the editing result application-target album determination component 1906 determines whether the determination-target album (hereinafter "second album of interest") is a target album to which to apply the editing result, based on the setting made in S2106. In a case where the result of the determination in this step is positive, the flow proceeds to S2108. On the other hand, in a case where the result of the determination is negative, the flow proceeds to S2110.

In S2108, the editing result application-target region determination component 1907 determines whether the target region satisfies any of the conditions set by the editing result application condition setting component 1904. In a case where the result of the determination in this step is positive, the flow proceeds to S2109. On the other hand, in a case where the result of the determination is negative, the flow proceeds to S2110.

In S2109, the editing result application component 1908 applies the contents of the result of the editing performed on the predetermined album to the target region in the album that has obtained a positive determination result in both S2107 and S2108.

In S2110, the editing result application component 1908 determines whether the processes in S2107 to S2109 have been finished for all albums other than the predetermined edited album. In a case where the result of the determination in this step is positive, the flow proceeds to S2111. On the other hand, in a case where the result of the determination is negative, the second album of interest is changed to an undetermined album and then the flow returns to S2107.

In S2111, the editing result application component 1908 determines whether the processes in S2103 to S2110 have been finished for all albums. In a case where the result of the determination in this step is positive, the series of processes is terminated. On the other hand, in a case where the result of the determination in this step is negative, the first album of interest is changed to an undetermined album, and then the flow returns to S2103.

<<Advantageous Effects of the Present Embodiment>>

The automatic generation of a double-page spread to be added and the application of the result of editing of a common double-page spread in a predetermined album to another album(s) in the present embodiment have been described above. According to the present embodiment, a double-page spread to be added can be automatically generated in response an instruction to add a double-page spread from the user. Moreover, the result of editing of a common double-page spread can be applied to each album individually, which makes it possible to perform suitable editing on each album individually.

Embodiment 2

In Embodiment 1, in a case of applying the result of editing of a predetermined album to an album(s) other than the predetermined album, the information on the change made as a result of the editing of the predetermined album is used. Unlike this, in the present embodiment, a double-page spread similar to the double-page spread edited in the predetermined album is created based on the edited double-page spread, and the created double-page spread is added to another album(s). Note that in the present embodiment, description of constituent components similar to those in Embodiment 1 is omitted as appropriate by, for example, denoting them with the same reference signs or using the same names.

Figure 22A:
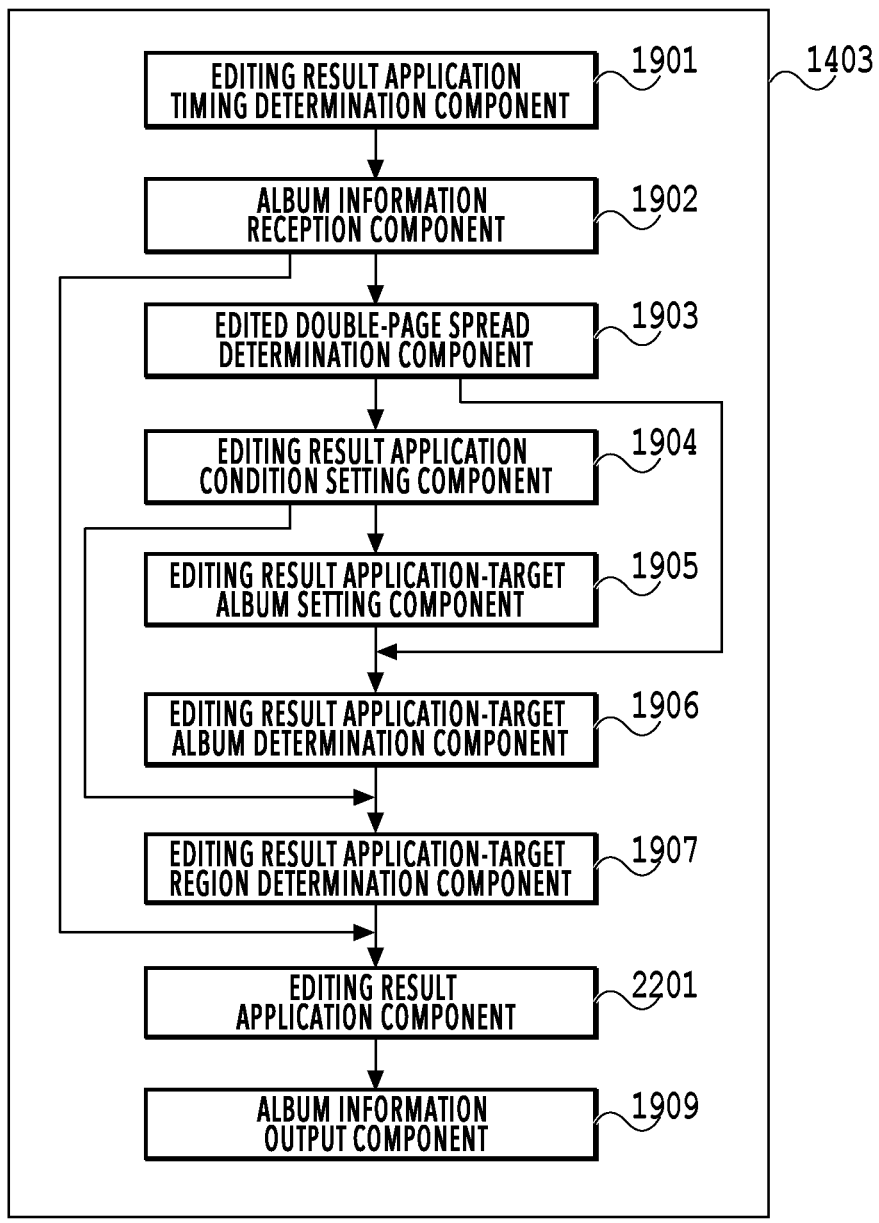
FIGS. 22A and 22B are software block diagrams of an album editing application.

A functional configuration in the present embodiment will be described below using FIGS. 22A and 22B. FIG. 22A is a software block diagram illustrating a module group related to the applying of an editing result as modules included in the album editing application 1400 in the present embodiment.

An editing result application component 2201 applies the contents of editing of a predetermined album to albums other than the predetermined album. Specifically, based on the double-page spread edited in the predetermined album, the editing result application component 2201, for each of the other albums, creates or adds a double-page spread that is similar to the edited double-page spread and also suitable for the album. Note that, in the present embodiment too, the contents of the editing result are not applied to at least one other album, as with Embodiment 1.

Figure 22B:
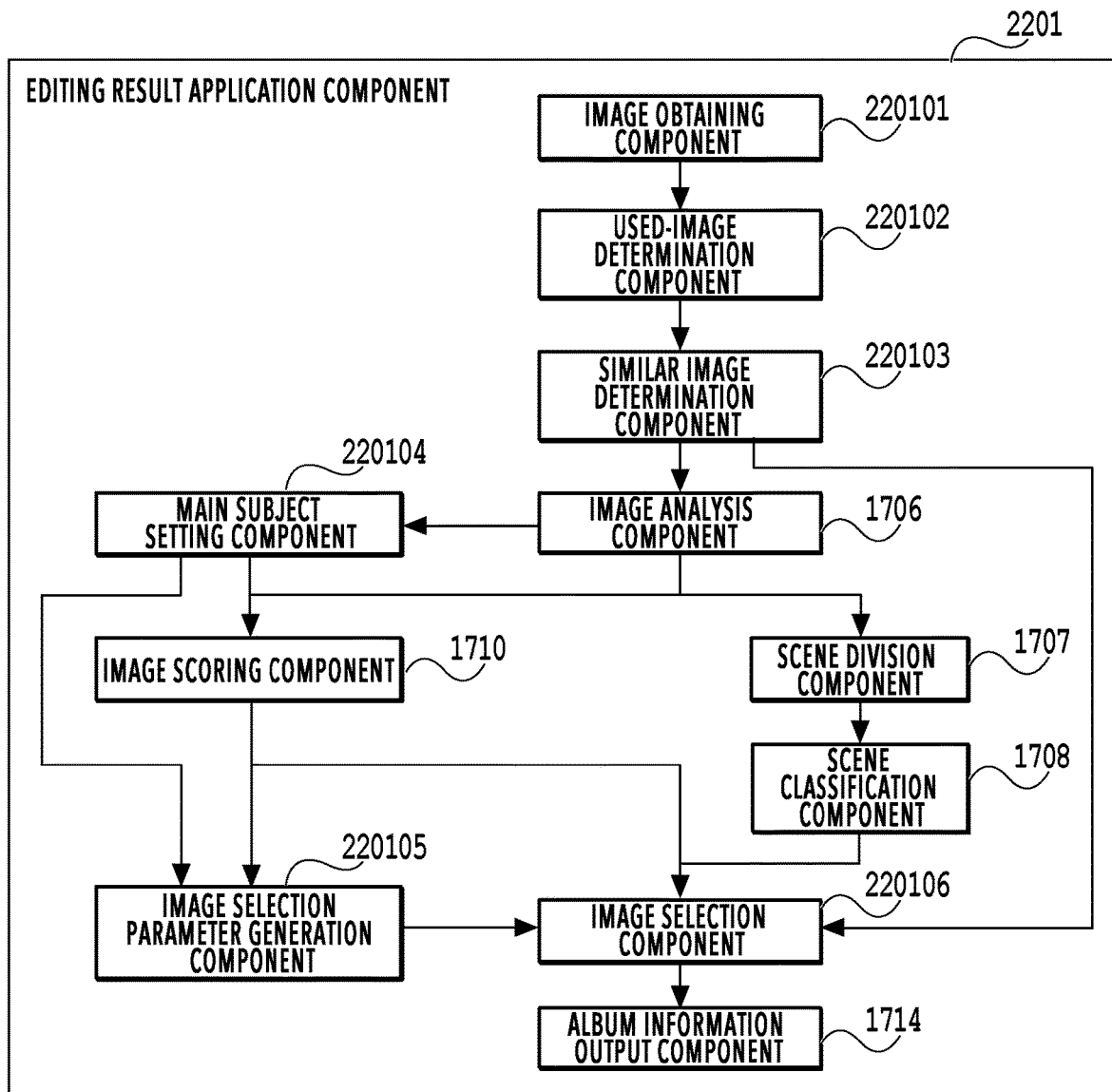

FIG. 22B is a detailed software block diagram of the editing result application component 2201 in a case where the editing content application process is a process of creating and adding a similar double-page spread.

An image obtaining component 220101 is a processing component similar to the image obtaining component 203 used in the album creation (see FIG. 2A). An image group obtaining process by the image obtaining component 220101 may be skipped in a case where the user has not designated which image group the image obtaining component 220101 should obtain, a case where the user has designated the same image group as that in the album creation and the data obtained by the image obtaining component 203 is still held, or another similar case. In this case, the data obtained by the image obtaining component 203 may be used as is. However, in a case where the data in the HDD 104 has been updated, the image group is obtained from the HDD 104.

Based on the image use information contained in the album information received by the album information reception component 1902, the used-image determination component 220102 determines, for each image obtained by the image obtaining component 220101, whether the image is an image used in an album. This determination is made by using the image use information on all albums. In the present embodiment, information on each image determined as a used image by the used-image determination component 220102 is handled as used-image information along with information indicating in which double-page spread in which album the image is used. In a case where an image determined as a used image is placed in an album, image duplication will occur in one or more albums. For this reason, a recommendation using a used image is not created. As means for avoiding use of a used image in the double-page spread to be added, a flag indicating whether the image is a used image (used-image flag), an image label, or the like may be employed. For each image determined as a used image by the used-image determination component 220102, the following process may be skipped, or the image may be excluded from the selection targets in the image selection. Note that in the present embodiment, the used-image flag is turned on.

A similar image determination component 220103 performs image similarity determination to determine whether images are similar. In the present embodiment, the similarity determination is performed between an image with the used-image flag turned on and another unused image. An image determined to be similar to a used image in this similarity determination is an image similar to an image in the double-page spread and is potentially a better image, and may therefore be used in the double-page spread creation. Also, as many similarity labels as the images in the double-page spread are set. In a case where there are a plurality of unused images determined to be similar to the same image in the double-page spread, the unused images are managed with the same similarity label attached thereto. A single image is selected from each of groups of images with the same similarity label to create a double-page spread. In this way a similar double-page spread can be created.

The image similarity determination may, for example, be determination using Structural Similarity (SSIM). Specifically, the SSIM value of an image in the edited double-page spread and an image obtained by the image obtaining component 220101 may be calculated, and in a case where the calculated SSIM value is greater than or equal to a threshold value of 0.8, the images may be determined to be similar. Note that this threshold value of 0.8 is an example, and another value may be employed. Alternatively, PSNR may be used instead of SSIM. In the case of using PSNR too, the threshold value may be set freely, e.g., 40 dB. As for the method of determining this threshold value, it may be set in advance or may be selected by the user. In the case where the user selects the threshold value, an indirect selection method may be employed such as operating a slider to increase or decrease the threshold value, instead of directly determining the threshold value. In a case where the images to be subjected to the similar image determination differ in size, the size of the unused image, which is the determination target, is adjusted to the size of the used image, and then the similar image determination is performed. For example, in a case where the used image is smaller than the unused image, the unused image is cropped with the size of the used image, and then the similar image determination is performed. Conversely, in a case where the used image is larger than the unused image, the unused image is enlarged to the same size of the used image, and then the similar image determination is performed. Another example of similar image determination is a method in which the images are sorted based on the contents appearing therein. For example, a method in which images are classified by main subject may be employed. Alternatively, a method in which the objects in images are detected and images containing many identical objects are classified as similar images.

A main subject setting component 220104 sets the main subject to be emphasized (prioritized) for each album. The main subject setting component 220104 is a processing component similar to the main subject setting component 205. In the present embodiment, the main subjects of a common double-page spread in album editing are different from those in the album creation such that two types of main subjects are set, namely, the main subject of the individual double-page spread(s) in the album creation and the main subjects of the common double-page spread(s) in the album creation. In this way, the main subjects of a common double-page spread in album editing vary by album, which makes it possible to select similar images individually suitable for the respective users.

An image selection parameter generation component 220105 generates a parameter for selecting an image (image selection parameter) based on the main subjects set by the main subject setting component 220104 and the analysis information obtained by the image analysis component 1703. The image selection parameter here represents a setting value that determines an image selection criterion. Such a parameter is, for example, a weight to be applied to the scores obtained by the image scoring component 1710.

An image selection component 220106 performs image selection by using the parameter generated by the image selection parameter generation component 220105. In the present embodiment, the final image score of each image in the group of images each determined to be similar to an image placed in the double-page spread by the similar image determination component 220103 is calculated, and the image selection component 220106 selects the image with the highest score. The image that has been placed is replaced with the image selected by the image selection component 220106. In this way, a similar double-page spread as a product reflecting the contents of an editing result is created for each album.

As described above, the editing result application component 2201 creates a similar double-page spread for each album to which to apply the editing contents by taking the user (i.e., main subject) associated with that album into account. This makes it possible to perform suitable editing for each album individually.

Figure 23:
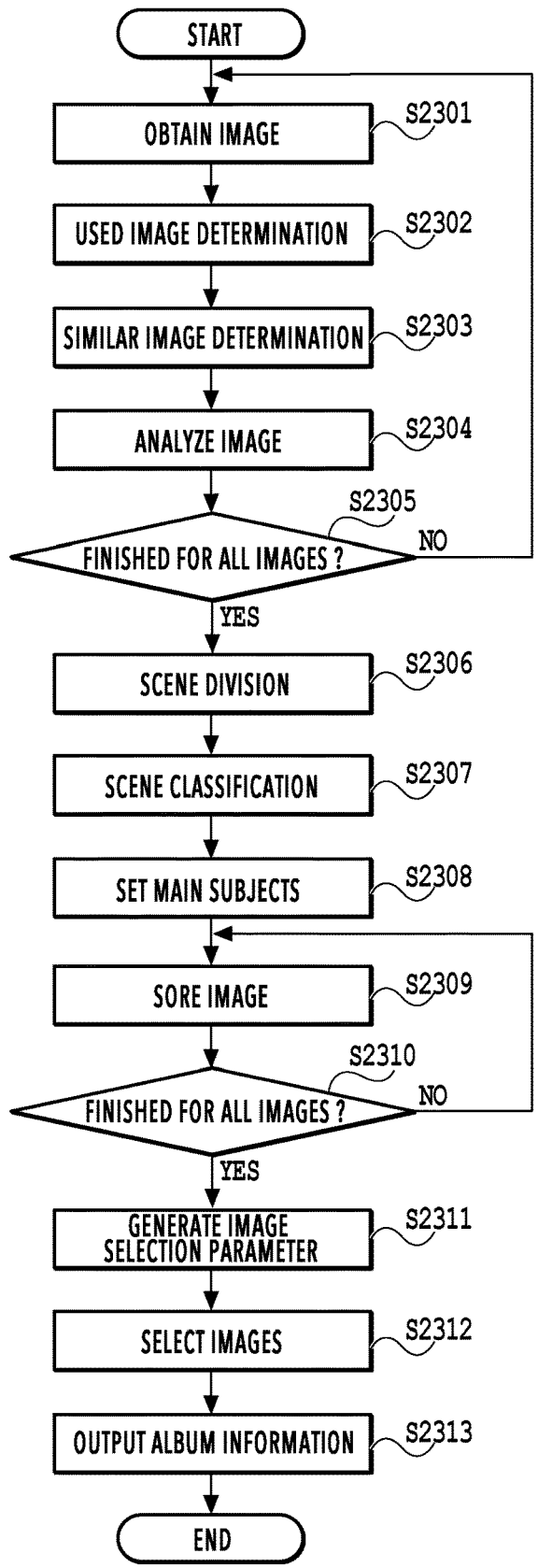
FIG. 23 is a flow diagram illustrating a process of applying the result of editing of a predetermined album to another album(s).

FIG. 23 is a flowchart illustrating a process of applying an editing result.

In S2301, by using the information on the image group used in the editing which is received by the album information reception component 1902, the image obtaining component 220101 reads a candidate image group from the HDD 104 and loads it into the RAM 103. Note that the process in this step may be skipped in a case where the candidate image group has already been loaded in the RAM 103.

In S2302, the used-image determination component 220102 determines whether an image obtained by the image obtaining component 220101 is an image already used in an album. This determination is performed based on the image use information contained in the album information received by the album information reception component 1902 and the criterion determined by the double-page spread criterion determination component 1703. For example, in a case where the double-page spread criterion determination component 1703 has determined that the double-page spread criterion is the individual criterion, the used-image determination component 220102 may determine whether the image is a used image by using the image use information on the editing-target album. On the other hand, in a case where the double-page spread criterion determination component 1703 has determined that the double-page spread criterion is the common criterion, the used-image determination component 220102 may determine whether the image is a used image by using the image use information on all albums.

In S2303, the similar image determination component 220103 performs similar image determination by using the result of the determination of whether the image is a used image or another image by the used-image determination component 220102.

In S2304, the image analysis component 1706 analyzes the image data loaded in the RAM 103. The image analysis process involves a process flow similar to the process explained in FIG. 5B.

In S2305, the image analysis component 1706 determines whether the processes in S2301 to S2304 have been completed for all images in the image group in the HDD 104 that can be obtained by the image obtaining component 220101. In a case where the result of the determination in this step is positive, the flow proceeds to S2306. On the other hand, in a case where the result of the determination is negative, the flow returns to S2301.

In S2306, the scene division component 1707 executes scene division on the image group obtained by the image obtaining component 220101. S2306 is a similar process to S505.

In S2307, the scene classification component 1708 executes scene classification on the sub image groups obtained by the division by the scene division component 1707. S2307 is a similar process to S506.

In S2308, the main subject setting component 220104 sets the main subject of each album. In the setting process in this step, the main subject setting component 220104 obtains information indicating the main subject of each album that is based on the result of the determination by the edited double-page spread determination component 1903, and uses the obtained information.

In S2309, the image scoring component 1710 scores an image. S2309 is a similar process to S508.

In S2310, the image scoring component 1710 determines whether the scoring in S2309 has been completed for all of the images analyzed by the image analysis component 1706. In a case where the result of the determination in this step is positive, the flow proceeds to S2311. On the other hand, in a case where the result of the determination is negative, the flow returns to S2309.

In S2311, the image selection parameter generation component 220105 generates the image selection parameter by using information on the main subject of the edited double-page spread received from the main subject setting component 220104. S2311 is a similar process to S510.

In S2312, the image selection component 220106 selects images by using the image selection parameter generated in S2311 and the result of the similar image determination in S2303 to create a similar double-page spread.

In S2313, the album information output component 1714 outputs album information.

<<Advantageous Effect of the Present Embodiment>>

The application of the contents of the result of editing performed on a predetermined album to an album(s) other than the predetermined album in the present embodiment has been described above. Specifically, in the other album(s), a double-page spread is created which has a layout similar to a common double-page spread edited in the predetermined album. Here, the contents of the editing result are not applied to at least one of the albums. In this way, the layout of each album can be adjusted individually.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. Also, the contents of the above-described embodiments may be combined as appropriate.

According to the present embodiment, in a case where editing of a common double-page spread is performed on the album of one user, the contents of that editing result can be selectively applied on a per user basis.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-020374, filed Feb. 12, 2021, which is hereby incorporated by reference herein in its entirety.

What is claimed is:

1. A non-transitory computer-readable storage medium storing a program that causes a computer to function as:
an editing unit configured to edit a layout of an album of a plurality of albums each having an attribute of a common double-page spread common to all of the albums and an attribute of an individual double-page spread in each of the albums as double-page spread attributes;
a first determination unit configured to determine whether an edited predetermined double-page spread in a predetermined album on which editing is performed is a common double-page spread;
a second determination unit configured to determine, for each of the plurality of albums other than the predetermined album, whether the album is an album to which to apply a content of a result of the editing of the predetermined album in a case where a result of the determination by the first determination unit is positive; and
an applying unit configured to apply the content of the result of the editing of the predetermined album to an album determined to be the album to which to apply the content of the result of the editing of the predetermined album,
wherein the predetermined double-page spread is evaluated by a score based on a main subject corresponding to a first album of the plurality of albums other than the predetermined album and a score based on a main subject corresponding to a second album of the plurality of albums other than the predetermined album,
wherein the applying unit applies the result of the editing of the predetermined album to the first album in a case where a score of the predetermined double-page spread to which the result of the editing of the predetermined album is applied based on the main subject corresponding to the first album is greater than a score of the predetermined double-page spread to which the result of the editing of the predetermined album is not applied based on the main subject corresponding to the first album, and
wherein the applying unit does not apply the result of the editing of the predetermined album to the second album in a case where a score of the predetermined double-page spread to which the result of the editing of the predetermined album is applied based on the main subject corresponding to the second album is not greater than a score of the predetermined double-page spread to which the result of the editing of the predetermined album is not applied based on the main subject corresponding to the second album.

2. The storage medium according to claim 1, wherein the applying unit applies the content of the result of the editing of the predetermined album to an album whose result of the determination by the second determination unit is positive.

3. The storage medium according to claim 1, wherein the album to which the applying unit applies the content is at least one album among the plurality of albums other than the predetermined album.

4. The storage medium according to claim 3, wherein the album to which the applying unit applies the content is not all of the plurality of albums other than the predetermined album.

5. The storage medium according to claim 1, wherein the computer is caused to further function as a third determination unit configured to determine, for each of the plurality of albums, whether the editing is performed on the album, before the determination by the first determination unit.

6. The storage medium according to claim 5, wherein the determination by the first determination unit is performed on an album whose result of the determination by the third determination unit is positive.

7. The storage medium according to claim 1, wherein the computer is caused to further function as a parameter generation unit configured to generate an image selection parameter for selecting an image similar to an image used in a common double-page spread added to the predetermined album.

8. The storage medium according to claim 7, wherein the computer is caused to further function as a setting unit configured to set a main subject of each of the albums, and
wherein the setting unit sets two main subjects as main subjects of a common double-page spread in album editing, the two main subjects including a main subject of an individual double-page spread in album creation and a main subject of a common double-page spread in the album creation.

9. The storage medium according to claim 8, wherein the parameter generation unit generates the image selection parameter based on the main subjects set by the setting unit.

10. The storage medium according to claim 1, wherein the plurality of albums to be edited by the editing unit are albums automatically generated for respective users.

11. The storage medium according to claim 1, wherein a plurality of units comprising the editing unit, the first determination unit, the second determination unit, and the applying unit is implemented by circuitry and/or at least one processor.

12. An image processing apparatus comprising:
an editing unit configured to edit a layout of an album of a plurality of albums each having an attribute of a common double-page spread common to all of the albums and an attribute of an individual double-page spread in each of the albums as double-page spread attributes;
a first determination unit configured to determine whether an edited predetermined double-page spread in a predetermined album on which editing is performed is a common double-page spread;
a second determination unit configured to determine, for each of the plurality of albums other than the predetermined album, whether the album is an album to which to apply a content of a result of the editing of the predetermined album in a case where a result of the determination by the first determination unit is positive; and
an applying unit configured to apply the content of the result of the editing of the predetermined album to an album determined to be the album to which to apply the content of the result of the editing of the predetermined album, wherein the predetermined double-page spread is evaluated by a score based on a main subject corresponding to a first album of the plurality of albums other than the predetermined album and a score based on a main subject corresponding to a second album of the plurality of albums other than the predetermined album, wherein the applying unit applies the result of the editing of the predetermined album to the first album in a case where a score of the predetermined double-page spread to which the result of the editing of the predetermined album is applied based on the main subject corresponding to the first album is greater than a score of the predetermined double-page spread to which the result of the editing of the predetermined album is not applied based on the main subject corresponding to the first album, and wherein the applying unit does not apply the result of the editing of the predetermined album to the second album in a case where a score of the predetermined double-page spread to which the result of the editing of the predetermined album is applied based on the main subject corresponding to the second album is not greater than a score of the predetermined double-page spread to which the result of the editing of the predetermined album is not applied based on the main subject corresponding to the second album.

13. The image processing apparatus according to claim 12, wherein the applying unit applies the content of the result of the editing of the predetermined album to an album whose result of the determination by the second determination unit is positive.

14. The image processing apparatus according to claim 12, wherein the album to which the applying unit applies the content is at least one album among the plurality of albums other than the predetermined album.

15. The image processing apparatus according to claim 14, wherein the album to which the applying unit applies the content is not all of the plurality of albums other than the predetermined album.

16. The image processing apparatus according to claim 12, further comprising a third determination unit configured to determine, for each of the plurality of albums, whether the editing is performed on the album, before the determination by the first determination unit.

17. The image processing apparatus according to claim 16, wherein the determination by the first determination unit is performed on an album whose result of the determination by the third determination unit is positive.

18. The image processing apparatus according to claim 12, wherein the plurality of albums to be edited by the editing unit are albums automatically generated for respective users.

19. The image processing apparatus according to claim 12, wherein a plurality of units comprising the editing unit, the first determination unit, the second determination unit, and the applying unit is implemented by circuitry and/or at least one processor.

20. An image processing method comprising:

editing a layout of an album of a plurality of albums each having an attribute of a common double-page spread common to all of the albums and an attribute of an individual double-page spread in each of the albums as double-page spread attributes;

determining whether an edited predetermined double-page spread in a predetermined album on which editing is performed is a common double-page spread;

determining, for each of the plurality of albums other than the predetermined album, whether the album is an album to which to apply a content of a result of the editing of the predetermined album in a case where a result of the determining is positive; and applying the content of the result of the editing of the predetermined album to an album determined to be the album to which to apply the content of the result of the editing of the predetermined album, wherein the predetermined double-page spread is evaluated by a score based on a main subject corresponding to a first album of the plurality of albums other than the predetermined album and a score based on a main subject corresponding to a second album of the plurality of albums other than the predetermined album, wherein the applying applies the result of the editing of the predetermined album to the first album in a case where a score of the predetermined double-page spread to which the result of the editing of the predetermined album is applied based on the main subject corresponding to the first album is greater than a score of the predetermined double-page spread to which the result of the editing of the predetermined album is not applied based on the main subject corresponding to the first album, and wherein the applying does not apply the result of the editing of the predetermined album to the second album in a case where a score of the predetermined double-page spread to which the result of the editing of the predetermined album is applied based on the main subject corresponding to the second album is not greater than a score of the predetermined double-page spread to which the result of the editing of the predetermined album is not applied based on the main subject corresponding to the second album.

* * * * *